(12) United States Patent
Wollmer et al.

(10) Patent No.: US 10,127,591 B1
(45) Date of Patent: Nov. 13, 2018

(54) SYSTEMS, METHODS, AND DEVICES FOR DYNAMIC USED VEHICLE MARKETING, DEALER MATCHING, AND EXTENDED SALE PERIOD TRANSACTIONS PLATFORM

(71) Applicant: WIPPY, LLC, Chicago, IL (US)

(72) Inventors: Bradley James Wollmer, Chicago, IL (US); Scott David Clark, Chicago, IL (US); Jeffrey Henry Baer, Westport, CT (US)

(73) Assignee: Wippy, LLC, Chicago, IL (US)

( * ) Notice: Subject to any disclaimer, the term of this patent is extended or adjusted under 35 U.S.C. 154(b) by 0 days.

(21) Appl. No.: 15/979,094

(22) Filed: May 14, 2018

Related U.S. Application Data

(60) Provisional application No. 62/506,071, filed on May 15, 2017, provisional application No. 62/561,041, filed on Sep. 20, 2017, provisional application No. 62/561,074, filed on Sep. 20, 2017.

(51) Int. Cl.
*G06Q 30/00* (2012.01)
*G06Q 30/06* (2012.01)
*G06F 17/30* (2006.01)
*G06Q 30/08* (2012.01)
*G06Q 40/02* (2012.01)

(52) U.S. Cl.
CPC ... *G06Q 30/0619* (2013.01); *G06F 17/30867* (2013.01); *G06Q 30/0603* (2013.01); *G06Q 30/0609* (2013.01); *G06Q 30/08* (2013.01); *G06Q 40/025* (2013.01)

(58) Field of Classification Search
CPC ......... G06F 17/30; G06Q 30/08; G06Q 40/04

USPC .................................................... 705/26, 27
See application file for complete search history.

(56) References Cited

U.S. PATENT DOCUMENTS

| | | |
|---|---|---|
| 6,006,201 A | 12/1999 | Berent et al. |
| 7,827,069 B2 | 11/2010 | King et al. |
| 7,908,180 B2 | 3/2011 | Goclowski |
| 8,095,422 B2 | 1/2012 | Hallowell et al. |
| 8,515,817 B2 | 8/2013 | Noy et al. |
| 8,738,472 B2 | 5/2014 | Hallowell et al. |
| 9,460,467 B2 | 10/2016 | Seergy et al. |
| 9,727,905 B2 | 8/2017 | Swinson et al. |

(Continued)

OTHER PUBLICATIONS

Dixit et al., "A taxonomy of information technology-enhanced pricing strategies," www.sciencedirect.com; Journal of Business Research 2008, 275-283; ProQuest Dialog, 9pgs.*

(Continued)

*Primary Examiner* — Robert M Pond
(74) *Attorney, Agent, or Firm* — Knobbe, Martens, Olson & Bear LLP

(57) ABSTRACT

The disclosure herein provides methods, systems, and devices for marketing and selling used vehicles during an extended sale period and dynamically matching used vehicle dealers to used vehicle transactions. A used vehicle marketing and sales platform allows vehicles to be marketed and sold through a dynamic user interface before its date of availability and/or before auction using a dynamic price listing generation system. The used vehicle marketing and sales platform also matches used vehicle dealers to complete transactions through a dealer matching system in order to provide a physical location for delivery of a used vehicle and to provide fulfillment of the transaction.

20 Claims, 22 Drawing Sheets

(56) References Cited

U.S. PATENT DOCUMENTS

| | | | |
|---|---|---|---|
| 9,747,620 | B2 | 8/2017 | Swinson et al. |
| 2003/0105728 | A1 | 6/2003 | Yano et al. |
| 2004/0093284 | A1 | 5/2004 | Takaoka et al. |
| 2005/0256780 | A1 | 11/2005 | Eldred |
| 2006/0085209 | A1 | 4/2006 | Walker, III |
| 2007/0038522 | A1 | 2/2007 | Bell et al. |
| 2008/0091587 | A1* | 4/2008 | DeLaCruz ............. G06Q 30/08 705/37 |
| 2008/0177590 | A1 | 7/2008 | Brodsky et al. |
| 2008/0201163 | A1 | 8/2008 | Barker et al. |
| 2009/0006118 | A1 | 1/2009 | Pollak |
| 2009/0187513 | A1 | 7/2009 | Noy et al. |
| 2010/0070343 | A1 | 3/2010 | Taira et al. |
| 2010/0198629 | A1 | 8/2010 | Weisleder et al. |
| 2011/0022525 | A1 | 1/2011 | Swinson et al. |
| 2013/0006876 | A1 | 1/2013 | Swinson et al. |
| 2013/0030864 | A1 | 1/2013 | Pollak et al. |

OTHER PUBLICATIONS

MyDealerOnline, http://mydealeronline.com/index.html, retrieved May 1, 2018.
MyDealerOnline, http://mydealeronline.com/supplier.html, retrieved May 1, 2018.
Overview from Used Car Dealer Side, MyDealerOnline, http://portal.mydealeronline.com/HowItWorks.aspx, retrieved May 1, 2018.
Overview from Used Car Supplier Side, MyDealerOnline, http://portal.mydealeronline.com/HowItWorks.aspx, retrieved May 1, 2018.

* cited by examiner

SYSTEMS, METHODS, AND DEVICES FOR DYNAMIC USED VEHICLE MARKETING, DEALER MATCHING, AND EXTENDED SALE PERIOD TRANSACTIONS PLATFORM

CROSS-REFERENCE TO RELATED APPLICATIONS

The present application claims the benefit under 35 U.S.C. 119(c) to U.S. Provisional Patent Application No. 62/506,071, filed May 15, 2017, titled "SYSTEM FOR MARKETING USED VEHICLES," U.S. Provisional Patent Application No. 62/561,041, filed Sep. 20, 2017, titled "SYSTEM FOR POTENTIAL BUYERS OF USED VEHICLES TO AUTOMATICALLY SEARCH THE WHOLESALE MARKET INVENTORY OF PARTICIPATING COUNTER PARTIES AND AUTOMATICALLY CREATE A VIRTUAL GARAGE FOR THEIR REVIEW TO PURCHASE," and to U.S. Provisional Patent Application No. 62/561,074 filed Sep. 20, 2017, titled "SYSTEM TO MATCH A RETAIL USED VEHICLE BUYER TO AVAILABLE WHOLESALE INVENTORY THAT IS THEN ASSIGNED TO A PARTICIPATING DEALER FOR FULFILLMENT COMPLETION," the entirety of each of the foregoing applications is hereby incorporated herein by reference under 37 CFR 1.57.

BACKGROUND

Field

The embodiments of the disclosure generally relate to used vehicle marketing and transactions, and more particularly to systems, devices, and methods for marketing and selling used vehicles during an extended sale period and dynamically matching used vehicle dealers to used vehicle transactions.

Description

The current used vehicle marketing and sales systems involve disparate and unified actors and data sources such that the systems require superfluous computer system resources, costs, and time to implement. Thus, a more efficient system for marketing and selling used vehicles is necessary.

SUMMARY

Various embodiments described herein relate to systems, methods, and devices for marketing and selling used vehicles during an extended sale period and dynamically matching used vehicle dealers to used vehicle transactions.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

In some embodiment, an algorithmic-based system for electronic transmission of a dynamically generated notification configured to connect a used vehicle transaction with dealers during a vehicle extended sale period, the algorithmic-based system comprises one or more dealer databases configured to store a plurality of dealer profiles, the plurality of dealer profiles comprising desired transaction criteria for each of a plurality of dealers; a dynamic dealer match engine configured to generate dealer match scores to localize, from one or more dealer databases, one or more dealers for participation in a used vehicle transaction; one or more computer readable storage devices configured to store a plurality of computer executable instructions; and one or more hardware computer processors in communication with the one or more computer readable storage devices and configured to execute the plurality of computer executable instructions in order to cause the algorithmic-based system to: generate a dealer match score for each of the plurality of dealers, wherein the dealer match score comprises a measure of dealer compatibility with a transaction, wherein the dealer match score is calculated by processing a plurality of transaction elements and performing a comparative analysis between the plurality of transaction elements and the desired transaction criteria for each of the plurality of dealers, wherein the comparative analysis comprises one or more of: accessing the transaction criteria from the one or more dealer databases; analyzing, based on a used vehicle transaction price, whether the used vehicle transaction will produce a dealer qualifying margin, wherein the dealer qualifying margin comprises a minimum sales margin amount that a dealer will require to participate in the used vehicle transaction; accessing, from one or more historical financing databases, historical purchase financing data to determine the probability that the used vehicle transaction will require financing by the one or more dealers; dynamically determining the acceptable level of financing required by the one or more dealers; processing a subsidiary used vehicle trade-in transaction, the processing comprising dynamically determining whether the subsidiary used vehicle trade-in transaction will alter the used vehicle transaction price; assessing, from the plurality of transaction elements, the probability that an extended service plan will be included in the transaction; determining if the probability that an extended service plan will be included in the used vehicle transaction meets a minimum service plan probability threshold required by the one or more dealers; evaluating whether a subject vehicle of the used vehicle transaction constitutes an acceptable type prerequisite for the one or more dealers; filter the plurality of dealers based on the generated dealer match score for each of the plurality of dealers to identify a first set of dealers having a generated dealer match score above a predetermined threshold level; transmit electronically a dynamically generated computer notification to the first set of dealers, the dynamically generated computer notification configured to activate a remote subscriber computer and to enable connection via a URL over a computer network connection to a data source comprising data about the used vehicle transaction; and receive, over the computer network connection, an electronic confirmation from a first dealer in the first set of dealers, wherein the electronic confirmation activates access to data for completing the used vehicle transaction, wherein the data is accessible only by the first dealer to activate the electronic confirmation through the computer network connection.

In some embodiment, a system for facilitating a sale of a used vehicle to a prospective purchaser before the vehicle becomes available, the system comprises one or more price databases configured to store historical and/or current market pricing data corresponding to a plurality of completed and/or current used vehicle listings; one or more vehicle profile databases configured to store a plurality of vehicle profiles corresponding to a plurality of vehicles that will become available upon arrival of an availability date, wherein the availability date is temporally remote from a present date; one or more purchaser profile databases configured to store a plurality of purchaser profile data, the purchaser profile data comprising one or more of financial, desired vehicle identification, and contact information corresponding to a plurality of prospective purchasers; a vehicle listing price engine configured to dynamically determine a plurality of unique listing prices, each unique listing price of the plurality of listing prices corresponding to each of the plurality of prospective purchasers for each of the plurality of vehicles; a dynamic user interface configured to display updated market and pricing information; one or more computer readable storage devices configured to store a plurality of computer executable instructions; and one or more hardware computer processors in communication with the one or more computer readable storage devices and configured to execute the plurality of computer executable instructions in order to cause the system to: determine a minimum listing price for a target used vehicle based on a consignor sale price, wherein the consignor sale price is obtained from one or more consignor used vehicle databases; determine dynamically a market price for the target used vehicle, wherein determining the market price comprises analyzing the completed transaction data for one or more of the plurality of completed used vehicle transactions for vehicles having analogous characteristics to the target used vehicle; calculate dynamically, by the vehicle listing price engine, a unique listing price for a prospective purchaser, wherein the calculation comprises: analyzing purchaser profile data to determine lower and upper threshold pricing levels for the prospective purchaser; comparing the present date with the availability date; based on the comparison of the present date with the availability date, setting the unique listing price above the minimum listing price and below the market price; and wherein the difference between the unique listing price and the minimum listing price is lower when the present date is relatively temporally remote from the availability date, and the difference between the unique listing price and the minimum listing price is raised incrementally as the current date approaches the availability date; and transmit electronically, a dynamically generated computer notification, the dynamically generated computer notification displayed through the dynamic user interface, to the prospective purchaser, wherein the dynamically generated computer notification is configured to activate a remote subscriber computer and to enable connection via a URL over a computer network connection to a data source comprising data about the unique listing price; and receive, over the computer network connection, an electronic confirmation from the prospective purchaser, wherein the electronic confirmation activates access to data for purchasing the target used vehicle, wherein the data is accessible only by the prospective purchaser.

In some embodiment, a system for facilitating a sale of a used vehicle to a prospective purchaser, the system comprises a dynamic user interface configured to display updated market and transaction information; one or more computer readable storage devices configured to store a plurality of computer executable instructions; and one or more hardware computer processors in communication with the one or more computer readable storage devices and configured to execute the plurality of computer executable instructions in order to cause the system to: receive, from the prospective purchaser, search parameters for a target vehicle; access, by performing a search engine query across one or more consignor vehicle inventory databases based on the received search parameters, a plurality of used vehicle data entries; identify, using the search parameters inputted by the prospective purchaser, among the plurality of used vehicle data entries one or more similar used vehicles corresponding to the target vehicle; determine dynamically a listing price for each of the one or more similar used vehicles; assign, using one or more used vehicle ranking techniques, a relative ranking of each of the one or more similar used vehicles; generate, based on the relative ranking, a first subset of the one or more similar used vehicles; display, to the prospective purchaser through the dynamic user interface, the first subset of the one or more similar used vehicles; receive, from the prospective purchaser through a feedback mechanism, a purchaser assessment of one or more of the similar used vehicles from the first subset; generate, based on the relative ranking and the purchaser assessment of each of the similar used vehicles from the first subset, a second subset of the one or more similar used vehicles; display, to the prospective purchaser through the dynamic user interface, the second subset of the one or more similar used vehicles; receive, from the prospective purchaser, a manifestation of intent to purchase a designated used vehicle from the second subset; prompt the prospective purchaser, through the dynamic user interface, to select transaction terms from a plurality of available purchase selections generated by the system and/or third-party services; identify, based on the determined listing price and the selected transaction terms, one or more compatible dealers; prompt the user to select a dealer from the one or more compatible dealers; and schedule delivery of the designated used vehicle to the selected dealer.

In some embodiment, the displaying of the first subset or the second subset through the dynamic user interface comprises: presenting each of the one or more similar used vehicles alongside the corresponding determined listing price; obtaining, from one or more used vehicle marketplace databases, one or more alternative used car listings for each of the one or more similar used vehicles from the first subset or the second subset; presenting, adjacent to the one or more similar used vehicles and the corresponding determined listing price, the one or more alternative used car listings.

In some embodiment, the used vehicle is a car.

In some embodiment, the used vehicle is one of the following: car, boat, truck, aircraft, motorcycle, bicycle, bus, camper, personal water craft, limousine, locomotive, moped, scooter, rickshaw, sleigh, tank, tractor, and van.

In some embodiment, the search parameters comprise one or more of: vehicle make, vehicle model, exterior color, interior color, price, body type, mileage, location, age, date of availability, vehicle history, VIN, vehicle type, trim level, transmission type, engine type, fuel type, condition, and user rating.

In some embodiment, the vehicle ranking techniques comprise at least: obtaining, from the plurality of used vehicle data entries, a consignor price for each of the one or more similar used vehicles; obtaining, from a plurality of used car pricing databases, an estimated market price for each of the one or more similar used vehicles; generating, based on a comparison of the consignor price with the estimated market price, a value rating for each of the one or more similar used vehicles.

In some embodiment, the vehicle ranking techniques further comprise: calculating an estimated transport cost for each of the one or more similar used vehicles based on a comparison of a current location of each of the one or more similar used vehicles and a user location; and adding the estimated transport cost to the consignor price.

In some embodiment, the feedback mechanism comprises a binary decision tool, the binary decision tool displayed to the prospective purchaser for activation.

In some embodiment, the purchaser assessment comprises a positive signal or a negative signal, triggered by activation of the binary decision tool.

In some embodiment, the plurality of available purchase selections comprise supplementary features that can be added to the designated used vehicle.

In some embodiment, the supplementary features comprise one or more of the following: extended service plans, extended warranties, tires, safety features, headlights, windshield wipers, headlight washers, headlight wipers, heated seats, heated side mirrors, heated steering wheel, remote start, windshield wiper deicers, winter tires, power seats, forward-collision warning, automatic emergency braking, backup cameras, rear cross-traffic alerts, blind-spot monitoring, Apple CarPlay, Android Auto, Bluetooth connectivity, 360-degree surround-view camera systems, heads-up displays, USB ports, voice control systems, dual-zone automatic climate control, automatic high beams, spare tires, keyless entry, gesture/character recognition, DVD players, built-in navigation, Wi-Fi system, lane-keeping assistance system, hydrophobic windows, built-in vacuums, zero-gravity seats, massage seats, traffic light information systems, push button shifting, sunroof, night vision and radar detection systems, automatic parking systems, crash detection sensors, autopilot features, autonomous vehicle systems, adjustable seats, HVAC, cruise control, four-wheel drive, tow hitches, automatic transmission, leather seats, and other computer applications or car improvements.

In some embodiment, the connecting the designated used vehicle transaction with one or more dealers comprises dynamically determining whether the selected transaction terms are compatible with dealer-selected transaction parameters.

In some embodiment, a method for displaying market information relating to and facilitating the sale of used vehicles, each of the used vehicles having an exchange listing and one or more alternative listings, the method comprises dynamically displaying a first exchange listing for a first used vehicle, the first exchange listing being displayed in one of a plurality of locations in a first purchase selection region; dynamically displaying one or more first alternative listings for the first used vehicle, the one or more first alternative listings being displayed in another one of the plurality of locations in the first purchase selection region; displaying a feedback mechanism configured to allow a user to indicate positive or negative feedback on the quality of the first exchange listing; in response to an indication of negative feedback, removing from the display the first exchange listing and the one or more first alternative listings and dynamically displaying a second exchange listing for a second vehicle and one or more second alternative listings for the second vehicle, the second exchange listing being displayed in one of a plurality of locations in a second purchase selection region and the one or more second alternative listings being displayed in another one of the plurality of locations in the second purchase selection region; and in response to an indication of positive feedback, generating one or more additional exchange listings and alternative listings with similar listing characteristics to the first exchange listing; wherein the one or more first alternative listings and one or more second alternative listings are obtained from one or more third-party used vehicle marketplace databases.

In some embodiment, the system comprises dynamically displaying a consumer expertise signal configured to illustrate a user's level of knowledge based on the number of user activations of the feedback mechanism, wherein the consumer expertise signal is updated upon each activation of the feedback mechanism.

BRIEF DESCRIPTION OF THE DRAWINGS

The features, aspects and advantages of the embodiments of the inventions are described in detail below with reference to the drawings of various embodiments, which are intended to illustrate and not to limit the inventions. The drawings comprise the following figures in which:

FIG. 12 is a diagram of an example embodiment of a user interface for a used vehicle search history of the dynamically updated used vehicle marketing and sales platform disclosed herein;

DETAILED DESCRIPTION

Figure 1:
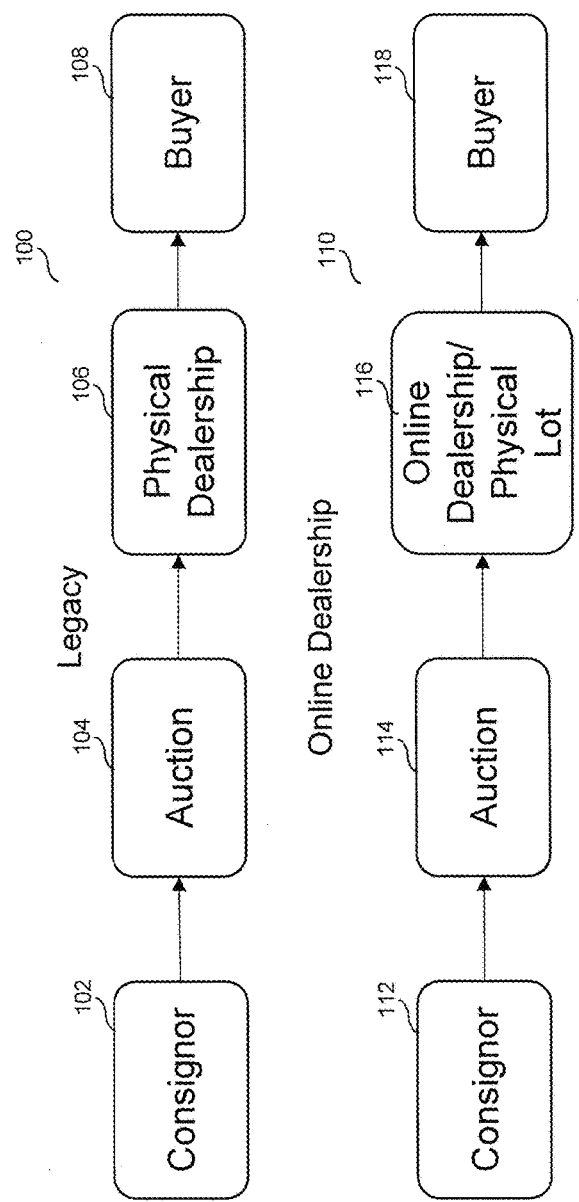
FIG. 1 is a flow chart illustrating example embodiments of used vehicle sales models.

The systems, methods, and devices described herein involve a used vehicle marketing and sales platform that may comprise a dynamically generated user interface that enables graphical display of used vehicle pricing data as a function of time in a period leading up to the termination of a "Pre-Gray" period and into a "Gray" Period. The platform may be enabled to interface with a plurality of disparate databases which store data having a plurality of incongruent data structures. The platform may be configured to interface with these data structures and conduct a normalization process to transform the data into a single, unified data structure. The normalized data can be presented to users through the dynamically generated user interface, which may be configured to automatically update its display based on newly acquired data and/or user interaction with the platform.

The used vehicle marketing and sales platform may also comprise systems for calculating and generating a transaction more efficiently through generation of interfaces for display of normalized data. These various interfaces may be distinctive to each user of a plurality of users, the distinctiveness generated based on, for example, user information or search data gathered by the platform. The various interfaces may form an aggregate dynamic user interface for sharing dynamic pricing data during a "Pre-Gray" period and a "Gray" period.

The used vehicle marketing and sales platform may also comprise systems for generating dynamic coordination of transactions with used vehicle dealership systems. The platform may be configured to access and evaluate a plurality of dealership databases to dynamically match completed transactions with compatible dealerships.

The used vehicle marketing and sales platform may also be configured to transmit electronically dynamically generated computer notifications, wherein the dynamically generated computer notifications can be displayed through the dynamic user interface to a user or other party, wherein the dynamically generated computer notification may be configured to activate a remote subscriber computer and to enable connection via a URL over a computer network connection to a data source comprising data directed to, for example, a unique listing price, a vehicle transaction, a corresponding used vehicle dealership, or other relevant data. The used vehicle marketing and sales platform may be further configured receive, over the computer network connection, an electronic confirmation from the user or other party, wherein the electronic confirmation activates access to data that facilitates a used vehicle transaction, wherein the data is accessible only by the user or other party that sends the confirmation.

The systems, methods, and devices described herein may improve computer system functionality in used vehicle marketing and sales systems by reducing wasted user system resources through elimination of the need to independently access a plurality of distinct third-party databases. The platform can be configured to access and interface with disparate data sources having incongruent communications and network protocols. The platform can be configured to obtain and normalize data to be displayed in a standard format to users, the data displayed through a dynamically generated user interface that is unique to each user. The systems, methods, and devices disclosed herein reduce processing power and network resources by providing a central platform for used vehicle transactions.

Used vehicles purchased via dealership can be sold using one of the used vehicle sales models 100 shown in FIG. 1.

In both the Legacy and Online Dealership models, used vehicles are sourced from vehicle suppliers, for example, consignors 102, 112, who are generally large firms that purchase vehicles new, use them in their course of business (such as leasing, vehicle rental or management fleet vehicles, or the like), and then such vehicle suppliers typically sell the car used when the vehicle is no longer needed. In some embodiments, these vehicles can be sent to a used vehicle auction or wholesale channel 104, 114 where the vehicles can be sold to the highest bidder. In some embodiments, these vehicles may also be sold to dealers or other parties directly or through some other transaction either by online or offline systems, but the majority of vehicles proceed through the Legacy model. In the Legacy model, the highest bidder may be a physical dealership 106 that takes the vehicle to the dealership for sale to a retail buyer 108. In the Online Dealership model, the highest bidder may be an Online Dealership 116, which can store the vehicle in a physical lot until an online buyer 118 purchases the car through the online dealership's website.

Both the Legacy and Online Dealership models have severe limitations. Between the vehicle source (for example, consignor) and the buyer, there can exist a number of inefficiencies, time delays, and/or costs that can ultimately get passed on to the buyer. For example, one or more vehicle inspections, one or more transportations to auction, one or more transportations to vehicle dealers, one or more storage facilities, one or more photography sessions, one or more auction fees, one or more re-conditioning events, one or more advertisements, one or more commissions, and one or more property costs, all of which increase the final retail cost of a vehicle sold through methods illustrated in FIG. 1.

Figure 2:
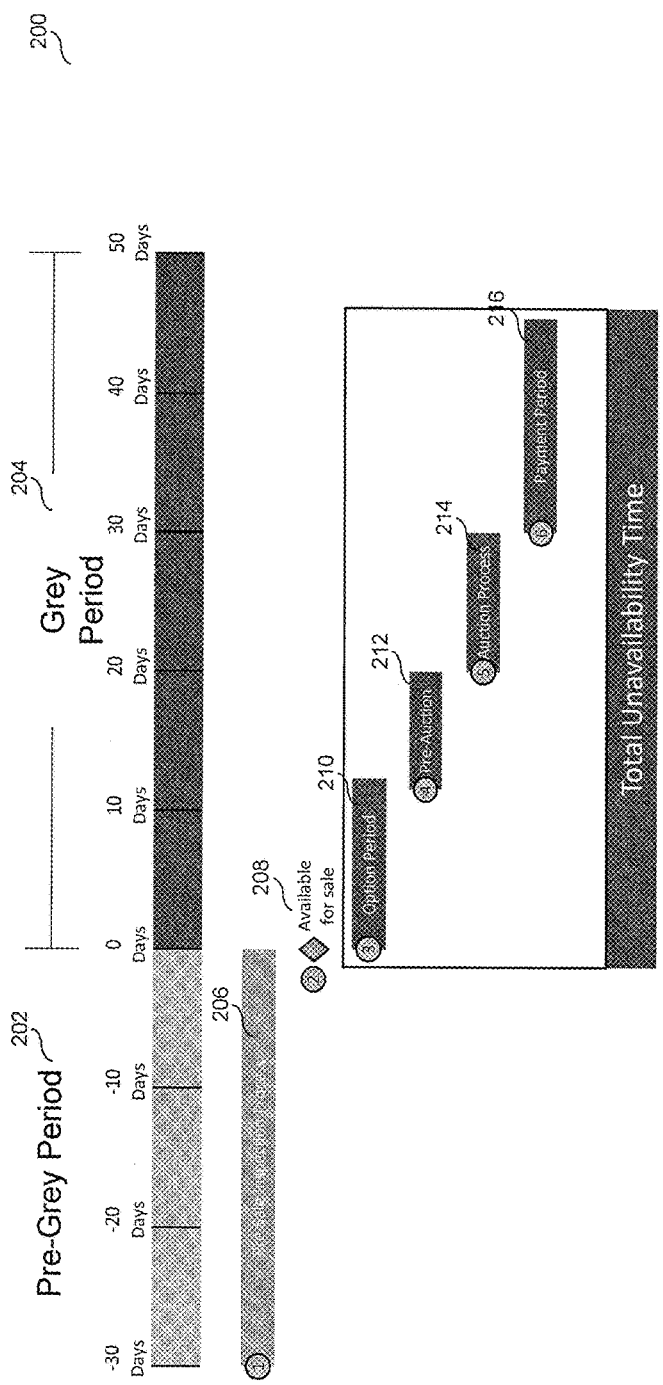
FIG. 2 is a schematic diagram illustrating an example embodiment of a timeline for a used vehicle auction transaction.

Furthermore, the Legacy and Online Dealership used vehicle sales models can be unnecessarily time-consuming. In some embodiments, a typical transaction timeline 200 is illustrated in FIG. 2. The timeline 200 begins in the "Pre-Gray" or pre-availability period 202. The pre-availability period represents a period of consignor ownership before the vehicle is available to be sold, generally through auction. Often, a consignor will know the exact date on which each of its vehicles will become available. In some embodiments, however, a consignor may be uncertain about when or if a certain vehicle will become available. For instance, if a certain vehicle is being leased and the lessee has an option to extend the lease or purchase the vehicle, the consignor may not know if and when the vehicle will be available until the option expires. The exact date of vehicle availability can also be delayed for other reasons such as but not limited to lessee's failure or delay to return the vehicle, failure or delay of the dealership in entering the vehicle into the system, and the like. Putting aside such delays, consignors, even if they are certain of an availability date 208, do not have a mechanism for marketing, selling, and/or removing vehicles from their balance sheets during the Pre-Gray or pre-availability period 202. Instead, vehicles may only undergo a pre-inspection process 206 during the Pre-Gray or pre-availability period 202 in preparation for a later sale at auction.

In some embodiments, after the pre-availability period 202, there exists a "Gray" period 204, in which a vehicle may undergo a series of processes, comprising an option period 210, a pre-auction period 212, an auction process 214, and a payment period 216. Each of these processes, and possibly additional processes, increases the time during which the vehicle is not available to retail buyers. For example, in the timeline 200 of FIG. 2, the total unavailability time is around 40-50 days after the availability date 208. In some embodiments, the unavailability time is can be about 10, 15, 20, 25, 30, 35, 40, 45, 50, 55, 60, 65, 70, 75, or more days. This unavailability time represents time in which the vehicle is unused and remains a financial burden for the consignor and/or other suppliers because for example consignors can be paying interest payments on the assets, or capital is tied up in such assets and cannot be deployed for other purchases, or the like. Even after the Gray period, the vehicle still must be transported to a physical dealership or physical lot, where it will consume valuable lot space and dealership resources, all of which can cost the consignor and/or the dealer additional costs. Another undefined period of time will pass until the used vehicle is finally sold to a buyer.

Finally, the current models typically require substantial up-front and ongoing dealership capital investment in order to acquire inventory from auction and hold and market that inventory until final sale to buyers.

Consequently, the used vehicle sales mechanisms of FIG. 1 are deficient. More time, cost, and capital efficient systems, methods, and devices for marketing and selling used vehicles before, during, and after the Gray period is necessary. The systems, methods, and devices described herein can provide a dynamically updated used vehicle marketing and sales platform that extends the used vehicle sale period to a date before the date of availability until the date the vehicle is sold at auction, and in some embodiments, after the auction date. In doing so, the used vehicle marketing and sales platform may reduce the various costs associated with the used vehicle sales models of FIG. 1, thereby increasing profits for consignors and/or dealers, and/or accumulating savings for buyers. Furthermore, in some embodiments, the used vehicle marketing and sales platform directly connects buyers with consignor inventory, eliminating intervening parties and/or processes to reduce the amount of time that vehicles are delayed from reaching consumers.

In some embodiments, the used vehicle marketing and sales platform is configured to generate a chained consignment agreement, wherein a consignor provides vehicle inventory data to the platform and the platform markets and sells the vehicles to buyers through a dynamic user interface during an extended sale period including the Pre-Gray period, the Gray period, and/or a post-Gray period. In some embodiments, the platform is further configured to match a vehicle sale or transaction with a used vehicle dealer. In some embodiments, the dealer can serve as a fulfillment agent for the vehicle transaction.

Various embodiments of systems, methods, and devices for marketing and selling used vehicles during an extended sale period and dynamically matching used vehicle dealers to used vehicle transactions are disclosed herein. In contrast to the methods for marketing and selling used vehicles shown in FIG. 1, used vehicle marketing and sales platform described herein facilitates used vehicle transactions during the Pre-Gray period and/or Gray period. The Pre-Gray period is the period before the date a vehicle becomes available from a consignor or other supplier, for example, before the vehicle lease ends or before a rental car agency retires the vehicle. The Gray period is the period starting at the date of availability and ending when the vehicle is sold through auction. In other words, the systems, methods, and devices described herein enable the marketing and selling of used vehicles directly to buyers before the date of availability and/or between the date of availability and sale at auction. The methods of marketing and selling used vehicles in FIG. 1 generally only provide retail buyers access to vehicles at physical or online dealerships after they have been sold through auction.

The systems, methods, and devices described herein have various advantages over the methods of FIG. 1, including, for example, reduced sale time, reduced costs for consignors, vehicle dealers, and buyers, reduced capital requirements, increased buyer access to vehicle inventory before auction, increased buyer convenience, and/or streamlining of the transaction process. The used vehicle marketing and sales platform can expose buyers to consignor inventory before the vehicles become available and/or before they have been sold to a physical or online dealership through auction. In addition to generating buyer demand for consignor inventory through a dynamic user interface, the systems, methods, and devices described herein restructure the entire used vehicle transaction process, from vehicle selection to final delivery.

In some embodiments, the used vehicle marketing and sales platform allows vehicles to be marketed and sold through a dynamic user interface before its date of availability and/or before auction using a dynamic price listing generation system. The dynamic price listing generation system can generate unique listing prices of used vehicles for individual buyers based on, for example, data concerning the individual buyers, comparison of the present date with a future availability date and/or auction date, buyer location data, vehicle location data, unique attributes specific to the vehicle (for example, mileage, condition, prior accidents, prior number of owners), vehicle demand data, similar vehicle availability in the market, consignor data (for example, consignor motivation to remove assets from inventory and/or balance sheet, number of future vehicles to become available, consignor incentives, consignor costs, consignor desired vehicle sale price, and the like) historical pricing data, historical sales data, historical dealer data, historical auction data, and/or market pricing data. In some embodiments, in order to incentivize buyers to purchase vehicles, the system can generate and display initial listing prices alongside future incremental increases in the unique listing price as the present date approaches the availability or auction date. In some embodiments, the platform can be configured to display savings in, for example, amount or percentage, to an end buyer over a dynamically determined market price for the vehicle. In some embodiments, the system may be configured to display alternative listings of similar vehicles from, for example, third party websites. In some embodiments, the alternative listings may include a price for the similar vehicles that is higher than the vehicle listed on the platform. In some embodiments, the platform can be configured to display savings on a vehicle in, for example, amount or percentage, to an end buyer over an alternative listing for a similar vehicle.

In some embodiments, the used vehicle marketing and sales platform comprises a deal creation system that can be configured to control the pricing and/or terms generated and displayed to buyers and/or facilitates the consummation of a used vehicle transaction. In some embodiments, the deal creation system supports dynamic generation of unique listing prices for used vehicles. In some embodiments, the deal creation system also enables calculation and display, through a dynamic user interface, of dynamic incremental price increases for used vehicles. In some embodiments, the deal creation system can also generate distinct transaction terms and/or source distinct transaction terms from third-party providers.

In some embodiments, the used vehicle marketing and sales platform comprises a dealer matching system that can be configured to match used vehicle dealers to a complete transaction in order to provide a physical location for delivery of the used vehicle and/or in order to serve as a fulfillment agent for the transaction. In some embodiments, the dealer matching system can dynamically generate a dealer match score that provides a measure of dealer compatibility with a transaction based on the complete transaction terms and/or dealer-specified requirements. In some embodiments, a real-time dynamic calculation analysis between the complete transaction terms and dealer-specified requirements is performed to determine the availability of used vehicle dealers to effectuate the deal. In some embodiments, the dealer matching system can provide buyers, through a dynamic user interface, the option to select a dealer from a list of matched used vehicle dealers that can complete the transaction. In some embodiments, dealers may compete and/or participate in a bidding system within the platform in order to be matched to the transaction by the dealer matching system or selected by the buyer. In some embodiments, dealers may lower their bid by, for example, decreasing a threshold required margin and/or transaction fee and/or commission and/or other fees or costs to be gained from a vehicle transaction. In some embodiments, the dealer matching system can dynamically and/or in real-time and/or automatically select a dealer having the highest dealer match score or otherwise having a high compatibility with the transaction to execute the deal. In some embodiments, the level of compatibility may be measured by several factors including, for example, vehicle price, sales margin, dealer costs, dealer commissions, historical ratings of dealer based on prior transactions and/or other user ratings, dealer fees, dealer location, dealer availability, customer location, quality of the dealer, historical timing of the transaction, trade-in existence, trade-in value, vehicle type, extended service plan existence, extended service plan terms, warranty existence, warranty terms, financing terms, upsell or supplementary items or features, add-ons, taxes, and other terms.

In some embodiments, the platform is connected to various third-party data and service providers that deliver, for example, auction data, user information, vehicle information, accident reports, ownership reports, vehicle photography, inspection, market, trade-in, financing, location, and historical transaction data and supply transaction terms such as financing terms, extended service plans, extended warranties, and add-on features, merchandise, and goods. In some embodiments, the platform connects to third-party data and service providers through one or more application programming interfaces (APIs). In some embodiments, the platform is configured to perform pre-processing and standardization of the acquired data from third-party databases. In some embodiments, the platform is configured to implement and/or utilize HTTP cookies or other digital fingerprint capabilities in order to collect geolocation data and other user data.

In some embodiments, the system offers add-on vehicle features, merchandise, and/or goods that can be added to the transaction. In some embodiments, the system is configured to recommend certain add-on features, merchandise, services, products, and/or goods based on, for example, historical purchasing information, third-party data acquired by the system, paid advertisements, and/or user preferences.

In some embodiments, the owner of the used vehicle marketing and sales platform may acquire possession and/or ownership of a used vehicle during the course of a transaction and/or during the various periods described herein. In other embodiments, the owner of the used vehicle marketing and sales platform may never take physical possession and/or ownership of a vehicle during the various periods described herein and/or during the transaction, wherein the vehicle is marketed or sold through the dynamic user interface. In some embodiments, a vehicle dealer may not take possession and/or ownership of a vehicle that is marketed or sold through the dynamic user interface until the transaction terms are selected and a dealer is matched to the transaction. An advantage of this configuration is that neither the owner of the used vehicle marketing and sales platform nor the dealership requires significant ongoing capital investments to participate in a used vehicle transaction and/or share in its profits. Another advantage is that vehicles do not need to be removed from the auction process to be marketed on the platform; in other words, a vehicle can simultaneously move through the auction process while also proceeding through the process set forth by the systems disclosed herein. In some embodiments, the vehicle may continue to proceed through the various steps of the auction process until it is sold through the platform and removed from the process or it is sold through auction and removed from the platform. In some embodiments, the used vehicle marketing and sales platform can be used as a concurrent listing site to an auction listing, and the owner of the platform may take no exclusive possession or ownership of consignor vehicles. In some embodiments, a vehicle can be put through the processes set forth by the systems herein prior to the vehicle entering the auction process and/or other processes for selling a vehicle. Thus, in some embodiments, the used vehicle marketing and sales platform may shorten the Gray period in which a vehicle is unused and/or unsold at very little risk or cost to a consignor. In some embodiments, the system may market and/or sell vehicles before their availability date, such that the Gray period is substantially eliminated, and the vehicle is transferred to the buyer before or immediately upon its date of availability.

In some embodiments, buyers may have no physical or haptic interaction with a vehicle before final purchase confirmation at a selected dealership. In other words, a buyer may have no opportunity to test-drive or inspect a vehicle in-person before purchase. In some embodiments, used vehicles will be discounted by the system in order to compensate a buyer for having no physical or haptic contact with the vehicle before purchase. In other embodiments, a buyer may physically inspect and test-drive the vehicle before purchase.

Figure 6:
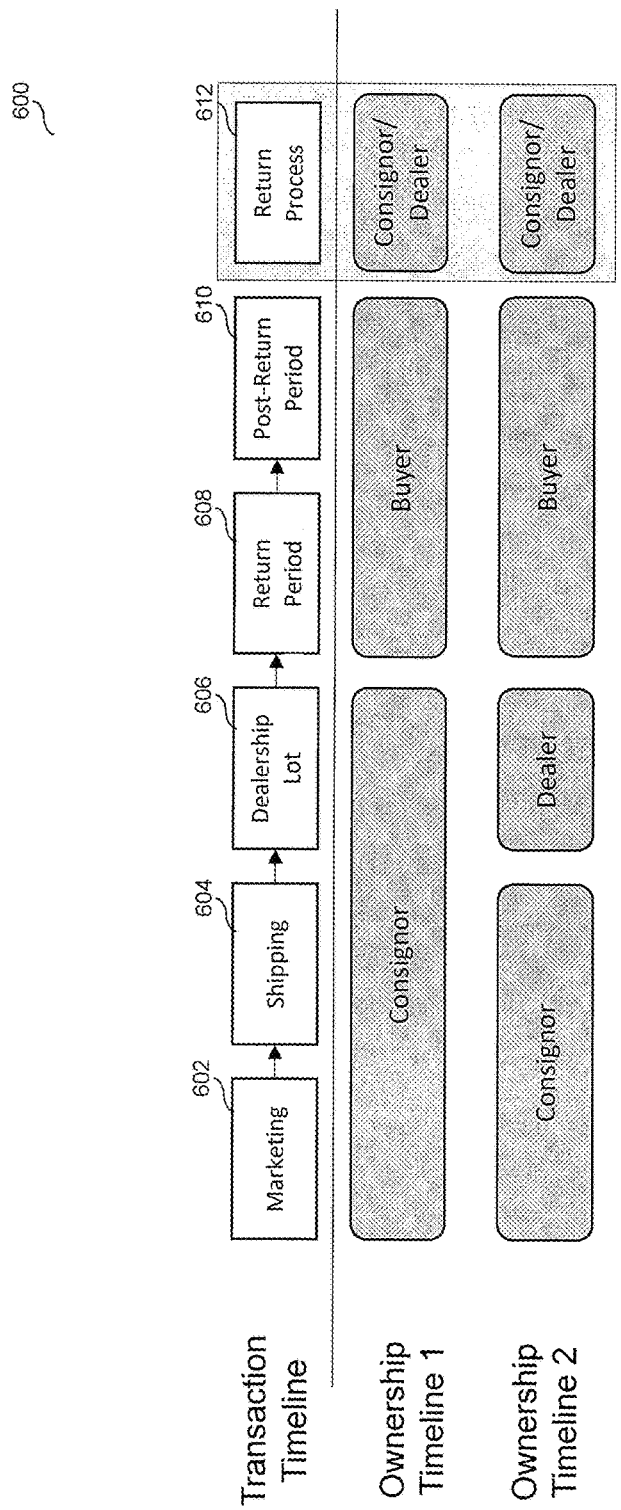
FIG. 6 is a flow chart illustrating example embodiments of the ownership flow used in the systems, methods, and devices disclosed herein.

FIG. 6 is a flow chart illustrating example embodiments of the ownership flow in the systems, methods, and devices for marketing and selling used vehicles during an extended sale period and dynamically matching used vehicle dealers to used vehicle transactions disclosed herein. In some embodiments, such as in ownership timeline 1, possession and/or ownership of a used vehicle remains with a consignor while the vehicle is subject to a marketing process 602 within the systems, methods, and devices disclosed herein. In some embodiments, the consignor maintains ownership even when the vehicle undergoes shipping 604 to a selected dealership 606. In other embodiments, such as in ownership timeline 2, ownership transfers to a dealer upon delivery to the dealership lot 606. In other embodiments, there may be other owners during transfer of the vehicle and/or during the fulfillment pendency. For example, during this period, a used vehicle may be owned by, for example, the owner of the used vehicle marketing and sales platform, a dealership, the buyer, or a third party. In some embodiments, once the used vehicle transaction has been completed, a buyer takes possession and ownership or the vehicle for a pre-determined return period 608 in which the buyer has the option to return the vehicle through a return process 612. In some embodiments, the dealer and/or the owner of the used vehicles marketing and sales platform may receive a deposit from the buyer prior to the return period 608. In some embodiments, a return during the return period 608 may nullify the transaction at no or very little cost to the buyer and transfer ownership and possession back to the consignor, dealer, or other prior ownership party. In some embodiments, the return period is a return guarantee period during which the vehicle can be returned, and the transaction can be cancelled. In some embodiments, the systems, methods, and devices disclosed herein may dynamically determine the length of the return period based on various factors including, for example, vehicle value, condition, transaction terms, dealer terms, vehicle make, vehicle model, and other factors. In some embodiments, the return period may end upon a pre-determined level of usage of the vehicle, measured in, for example, allowed mileage during the return period.

In some embodiments, after the return period 608, there is a post-return period, during which the buyer may enter the return process 612 at additional cost to the buyer. In some embodiments, the cost of the return process 612 may be adjusted in the event that a defect is found in the vehicle. Thus, in some embodiments, possession and ownership of the vehicle never transfers to the owner of the systems, methods, and devices described herein.

In some embodiments, a returned vehicle is placed back into the auction process, returned to the consignor, and/or relisted on the platform upon return. In other embodiments, the dealer or another contracting actor may take possession and/or ownership of a returned vehicle.

In some embodiments, the platform is further configured to access used vehicle availability data from one or more auction databases. In some embodiments, the used vehicle availability data can comprise information regarding vehicles currently in the auction process. In other words, the system can obtain vehicle data not only from consignor inventory databases but also auction databases. In addition, the used vehicle availability data from auction databases can comprise auction location and timing information, such that the system can determine when and where the vehicles will be sold. Using this data, along with historical transaction data, the system can determine whether or not to display a given vehicle to users for purchase. For example, if a given vehicle is currently in an exceedingly remote location from a user and/or is scheduled to be sold at auction within a short period of time, the system may determine, based on historical search and transaction data of similar vehicles, a probability that the vehicle will be sold before auction. In some embodiments, if the system determines that the probability of sale is below a threshold level, the vehicle may not be listed on the platform. In some embodiments, the probability of sale of a certain vehicle may influence the vehicle ranking system described herein. In some embodiments, the system may be configured to identify various vehicle features and compare those features to the corresponding features of other vehicles to determine similarity. Those features include, for example vehicle make, vehicle model, exterior color, interior color, price, body type, mileage, location, age, date of availability, vehicle history, VIN, vehicle type, trim level, transmission type, engine type, fuel type, condition, and user rating.

In some embodiments, the system may be configured to utilize the used vehicle availability data from the one or more auction databases in generating unique price listings. For example, the system may set a lower listing price at a temporally distant date from an auction date for a vehicle in order to incentivize early purchase. The system may be configured to transmit an electronic notification, through the dynamic user interface, to alert a user that the listing price of the vehicle may rise and/or that the vehicle may be delisted from the platform as the auction date approaches.

The systems, methods, and devices described herein reduce the time and cost associated with marketing and selling a used vehicle sourced from a consignor. In some embodiments, the systems, methods, and devices herein allow a consignor to avoid the conventional auction process entirely, saving time and costs. In some embodiments, consignor inventory can be marketed and sold directly through the systems, methods, and devices herein at no additional cost to the consignor. However, in some embodiments, a vehicle can be marketed and sold through the used vehicle marketing and sales platform, while still proceeding through the used vehicle auction process. If the vehicle is sold through the used vehicle marketing and sales platform, it can be removed from the auction process. Otherwise, it can continue to advance through the various processes described above with relation to FIG. 2, until it is sold through auction. In some embodiments, a vehicle is removed from the used vehicle marketing and sales platform before or at the time it is sold at auction.

The systems, methods, and devices herein relate to the marketing and sale of all used vehicles, and in particular, cars. Other vehicles that may be marketed and sold through the systems, methods, and devices herein include, for example, boats, trucks, aircraft, motorcycles, bicycles, buses, campers, personal water crafts, limousines, locomotives, mopeds, scooters, rickshaws, sleighs, tanks, tractors, and vans.

Figure 3:
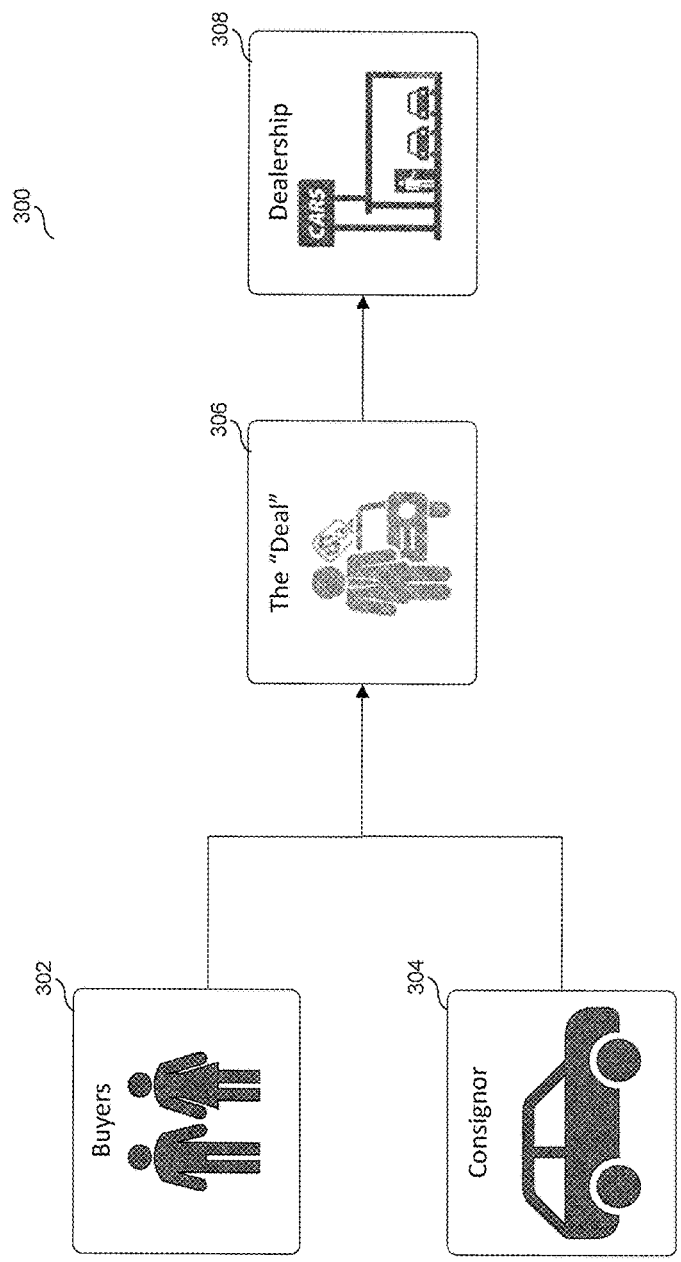
FIG. 3 is a flow chart illustrating an example embodiment of a dealer matching system for marketing and selling consignor vehicles to buyers and matching dealers to individual sales.

FIG. 3 is a flow chart illustrating an example embodiment of a process for matching consignor vehicles with buyers and dealers. In some embodiments, the used car marketing and sales platform can obtain vehicle data from a consignor 304. In some embodiments, this vehicle data may comprise one or more of vehicle make, vehicle model, exterior color, interior color, price, body type, mileage, location, age, date of availability, vehicle history, VIN, vehicle type, trim level, transmission type, engine type, fuel type, condition, and user rating.

In some embodiments, some or all of the vehicle data will be provided to buyers 302 via a dynamic user interface that updates based on various system elements described herein, including, for example, user feedback mechanisms, changing consignor inventories, standard periodic updates, vehicle ranking systems, user customization, user filtering and updated search parameters. In some embodiments, the buyer(s) 302 can select a vehicle for purchase through the dynamic user interface to commence a used vehicle purchase transaction. In some embodiments, through the dynamic user interface, the buyer(s) 302 will be offered and can select various transaction terms generated by the system or by third-party providers.

In some embodiments, the buyer(s) 302 will complete selection or acceptance of the transaction terms to consummate the transaction and create a deal 306. In some embodiments, the deal 306 will comprise various transaction terms, including, for example, price, trade-in existence, trade-in value, vehicle type, extended service plans, warranties, financing terms, upsell or supplementary items or features, taxes, and other terms. In some embodiments, the upsell or supplementary items or features may comprise, for example, extended service plans, extended warranties, tires, safety features, headlights, windshield wipers, headlight washers, headlight wipers, heated seats, heated side mirrors, heated steering wheel, remote start, windshield wiper deicers, winter tires, power seats, forward-collision warning, automatic emergency braking, backup cameras, rear cross-traffic alerts, blind-spot monitoring, Apple CarPlay, Android Auto, Bluetooth connectivity, 360-degree surround-view camera systems, heads-up displays, USB ports, voice control systems, dual-zone automatic climate control, automatic high beams, spare tires, keyless entry, gesture/character recognition, DVD players, built-in navigation, Wi-Fi system, lane-keeping assistance system, hydrophobic windows, built-in vacuums, zero-gravity seats, massage seats, traffic light information systems, push button shifting, sunroof, night vision and radar detection systems, automatic parking systems, crash detection sensors, autopilot features, autonomous vehicle systems, adjustable seats, HVAC, cruise control, four-wheel drive, tow hitches, automatic transmission, leather seats, and other computer applications or car improvements.

In some embodiments, based on the various transaction terms of the deal 306, the platform can determine a set of suitable used vehicle dealers 308 that can be matched with the deal. In some embodiments, matching used vehicle dealers 308 with a deal 306 may comprise comparing the transaction terms with dealer-specific requirements in a dealer match engine as described herein. In some embodiments, the suitable used vehicle dealers 308 are presented to the buyer for selection of a preferred dealer to complete the transaction. In other embodiments, the system may assign a dealer to complete the transaction.

Figure 4:
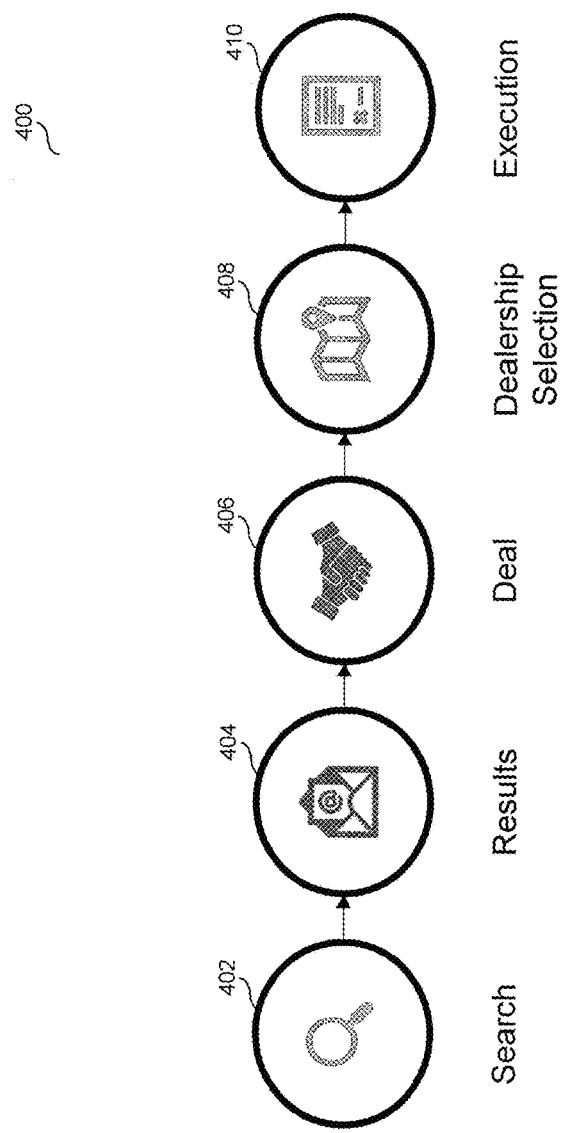
FIG. 4 is a flow chart illustrating an example embodiment of a used vehicle marketing and selling process of the dynamically updated used vehicle marketing and sales platform disclosed herein.

FIG. 4 is a flow chart illustrating an example embodiment of a used vehicle marketing and selling process. In some embodiments, a buyer can conduct a used vehicle search 402. In some embodiments, the system will receive, from the prospective buyer or purchaser, search parameters for a target vehicle. These search parameters may include, for example, vehicle make, vehicle model, exterior color, interior color, price, body type, mileage, location, age, date of availability, vehicle history, VIN, vehicle type, trim level, transmission type, engine type, fuel type, condition, user rating, and/or other features. Using the search parameters, the system may perform a search engine query across one or more vehicle inventory databases to obtain one or more used vehicle data entries. In some embodiments, the system can then identify, using the search parameters inputted by the prospective purchaser, among the one or more used vehicle data entries, one or more similar used vehicles corresponding to the target vehicle.

The one or more similar used vehicles can constitute search results 404, which can, in some embodiments be displayed, through a dynamic user interface, to the prospective purchaser or buyer. In various embodiments, the system can update, refine, and/or improve these results periodically in response updated inventory queries, updated search parameters, and/or user feedback. In some embodiments, the results are updated based on data acquired through periodic access to a consignor inventory database. In some embodiments, the updated results are transmitted via a transmission means including, for example, electronic mail, text message, instant message, dynamically generated website, or other electronic means of communication.

In some embodiments, the system can implement additional results features, such as vehicle recommendations or suggestions. For example, the used vehicle marketing and sales platform can identify and display vehicles to the prospective buyer or purchaser for consideration that do not match a user's specifications or search parameters. For example, the user may specify a desired vehicle brand that the system can search for, but in addition to vehicles matching that brand, the system may also display one or more vehicles of a similar or even dissimilar alternative brand for consideration. Another example may be if the user enters a specified vehicle model, the system can identify and display vehicles of that model, but also recommend vehicles of a different make and model. In some embodiments, recommendations may be based on historical purchase data, a calculated value rating, similarities to the target vehicle, and/or other considerations. In some embodiments, the recommendations may be paid advertisements.

If the prospective buyer selects a vehicle for purchase, the system can generate various transaction terms to create a deal 406 through a deal creation system that controls the pricing and terms generated and displayed to buyers and facilitates the completion of the used vehicle transaction. In some embodiments, the buyer or purchaser can be prompted to select from various purchase selections comprising different transactions terms. In some embodiments, the transaction terms can be generated by third-party providers to which the used vehicle marketing and sales platform has an established connection. In some embodiments, the used vehicle marketing and sales platform can dynamically generate the transaction terms. In some embodiments, the system can display both third-party and system generated transaction terms for selection. In some embodiments, one or more transaction terms are automatically assigned to a used vehicle transaction without user selection.

In some embodiments, once the purchase selections have been made and the deal 406 is accepted by the purchaser, the used vehicle marketing and sales platform can utilize a dealer matching system that matches used vehicle dealers to a complete transaction in order to provide a physical location for delivery of the used vehicle and/or a counterparty for the transaction. In some embodiments, the dealer matching system will match dealers based on their compatibility with the transaction, as described in more detail below. In some embodiments, the level of compatibility may be measured by several factors including, for example, vehicle price, sales margin, vehicle location, buyer location, trade-in existence, trade-in value, vehicle type, extended service plan existence, extended service plan terms, warranty existence, warranty terms, financing terms, upsell or supplementary items or features, taxes, and other terms. In some embodiments, the user can be prompted to make a dealership selection 408 from a list of compatible dealers. In some embodiments, the platform may be configured to provide vehicle title and registration services to the buyer. The specific implementation and nature of these services may vary based on the physical location of the buyer and dealer selected. In some embodiments, these services may be offered before dealer selection.

In some embodiments, once dealership selection 408 has been completed, the vehicle can be sent to the selected used vehicle dealer for pickup and execution 410. In some embodiments, the systems, methods, and devices disclosed herein may facilitate delivery of the vehicle to the buyer's home or another place where the dealer can complete fulfillment. In some embodiments, the owner of the used vehicle marketing and sales platform may also act as the dealer. In some embodiments, the owner of the platform may deliver a used vehicle through its own supply chain. This may occur, for example, if no other dealers are available or the platform is unable to identify a matching dealer. In some embodiments, execution 410 of the transaction can be completed entirely through the dynamic user interface of the used vehicle marketing and sales platform. In other embodiments, execution 410 of the transaction documents can be completed in-person, at the selected dealership.

Figure 5:
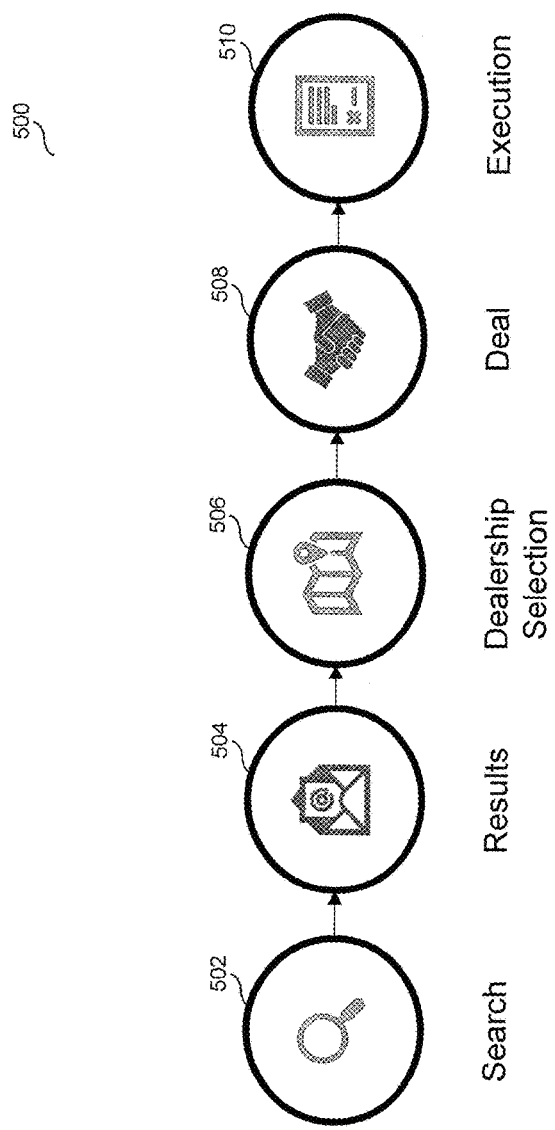
FIG. 5 is a flow chart illustrating another example embodiment of a used vehicle marketing and selling process of the dynamically updated used vehicle marketing and sales platform disclosed herein.

FIG. 5 is a flow chart illustrating another example embodiment of a used vehicle marketing and selling process. In the example embodiment of FIG. 5, dealership selection 506 can occur before purchase selections have been made by the user/buyer or transaction terms have been assigned by the system to the transaction. In some embodiments, dealership selection 506 that occurs before completion of the deal 508 can be facilitated by the dealer matching system described herein. In other embodiments, dealer selection 408 or 506 can be completed by user selection of several dealer options selectively presented based on current user location, vehicle type and/or current vehicle location.

Figure 7:
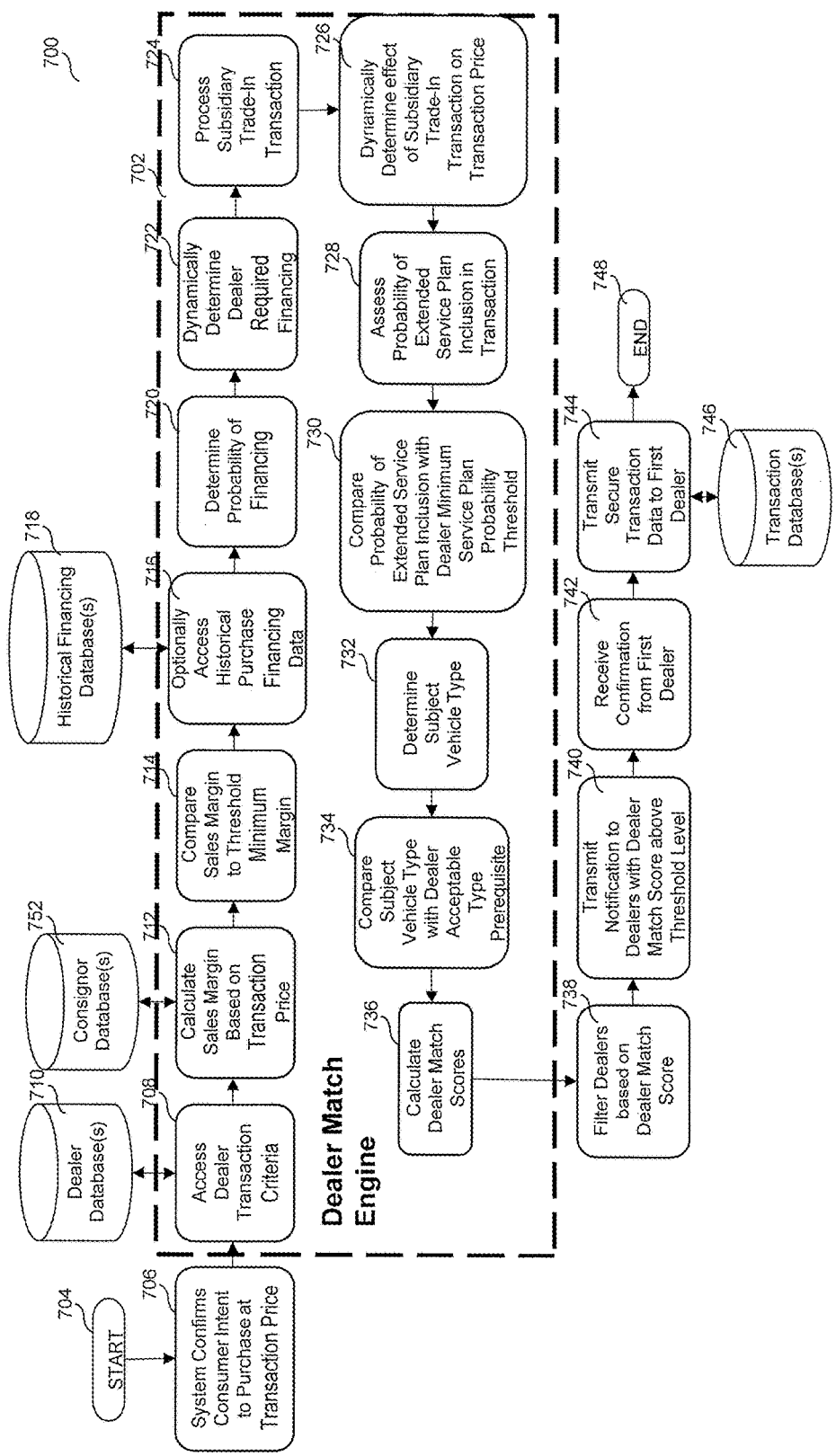
FIG. 7 is a flow chart illustrating an example embodiment of a dealer matching system of the dynamically updated used vehicle marketing and sales platform disclosed herein.

FIG. 7 is a flow chart illustrating an example embodiment of a dealer matching system of the of the used vehicle marketing and sales platform. In some embodiments, the dealer matching system 700 can comprise an algorithmic-based system for electronic transmission of a dynamically generated notification configured to connect a used vehicle transaction with dealers during a vehicle extended sale period. In some embodiments, the vehicle extended sale period comprises the Pre-Gray period and/or the Gray period described above. In some embodiments, the dealer matching system 700 functions to match a comprehensive used vehicle transaction awaiting execution to one or more compatible dealers. Dealer matching can occur at various points in the transaction process. In some embodiments, such as that shown in FIG. 7, dealer matching occurs upon system confirmation of a user's intent to purchase a vehicle at a specified transaction price with selected transaction terms at 706. In other embodiments, dealer matching may be performed at the time of the used vehicle search, at the time of vehicle selection but before transaction terms are specified, or at other times in the process.

In some embodiments, the dealer matching system comprises a dealer match engine 702 configured to generate dealer match scores to localize, from one or more dealer databases 710, one or more dealers for participation in a used vehicle transaction. In some embodiments, the dealer match score comprises a measure of dealer compatibility with a transaction, wherein the dealer match score is calculated by processing a plurality of transaction elements or terms and performing a comparative analysis between the plurality of transaction elements or terms and the desired transaction criteria for each of the plurality of dealers. In some embodiments, the dealer match engine 702 may not generate dealer match scores, instead localizing one or more dealers for participation through other algorithmic methods. In some embodiments, the dealer match engine 702 may localize one or more dealers for participation simply by locating the closest available dealers to the platform user.

In some embodiments, at 708, the dealer match engine 702 can be configured to access, from one or more dealer databases 710, a plurality of dealer profiles, the plurality of dealer profiles comprising desired transaction criteria for each of a plurality of dealers. Dealer transaction criteria generally correspond to the transaction terms, such as the need for and extent of dealer financing, existence and value of a trade-in vehicle, selection of extended warranties and/or services plans, sales margin of the transaction, vehicle inspection rating or other terms. Dealer transaction criteria may also comprise acceptable vehicle type, make, model, age, mileage, color, or other features described herein. For example, in some embodiments, a certain dealer may only execute transactions involving BMW cars. In another example, a certain dealer may only execute transactions meeting a sales margin of a certain threshold level and involving a trade-in vehicle.

In some embodiments, at 712, the dealer match engine 702 can be configured to calculate a sales margin based in-part on the difference between the specified transaction price of the vehicle and the consignor sales price, obtained from a consignor database 752. In some embodiments, the transaction price is the unique listing price generated by the vehicle listing price engine described below. In addition to the transaction price, other factors may be included in the calculation of sales margin, including, for example, transport costs, inspection costs, add-ons or upsell items, subsidiary trade-in transactions, extended service plans and warranties, overhead expenses, taxes, or any other applicable profits or expenses.

In some embodiments, at 714, the dealer match engine 702 may be configured to compare the calculated sales margin to dealer qualifying margin criteria. In some embodiments, the dealer qualifying margin criteria comprises a minimum threshold margin amount that a given dealer requires to participate in a given used vehicle transaction.

In some embodiments, at 716, the dealer match engine 702 may be configured to access one or more historical financing databases 718 to obtain historical purchase financing data to dynamically determine the probability that the used vehicle transaction will require financing by the one or more dealers or one or more third parties at 720. In some embodiments, at 722, the dealer match engine can be configured to dynamically determine the level of financing required by each dealer based on, for instance, a minimum specified threshold financing level, the transaction price and sales margin, transportation costs, add-ons, subsidiary trade-in transactions, extended service plans and warranties, overhead expenses, taxes, or any other applicable profits or expenses of the transaction. Alternatively, the dealer match engine 702 may be configured to prompt the user or buyer to indicate whether and what level of financing is desired or required. In some embodiments, the dealer match engine may be configured to pre-qualify the user or buyer for financing through one or more dealers and/or third parties. In some embodiments, the dealer match engine may be configured to dynamically determine qualifying lenders based on a buyer profile, obtained from a buyer profile database. The dynamic lender determination may be based on a variety of parameters such as, for example, buyer location, transaction price, level of financing required, vehicle information, and/or other factors.

In some embodiments, at 724, the dealer match engine 702 can be configured to process a subsidiary used vehicle trade-in transaction, the processing comprising dynamically determining the value of the trade-in transaction and identifying whether and how much the subsidiary used vehicle trade-in transaction will alter the used vehicle transaction price and thus, the calculated sales margin at 726. The dynamic determination may be completed by calculated trade-in transaction value using vehicle information provided by the user, historical trade-in pricing data, market value data, which can be obtained from system or third-party databases (not shown). In some embodiments, the trade-in transaction value may depend on various other factors including, for example, user location and current and projected dealer inventory.

In some embodiments, at 728, the dealer match engine 702 can be configured dynamically determine the probability that an extended service plan or warranty will be included in the used vehicle transaction. The probability can be determined from a various transaction or historical data including, for example, transaction price, vehicle model and make, vehicle age, vehicle color, user information, and others. Alternatively, the dealer match engine 702 may be configured to prompt the user or buyer to indicate whether and what type of extended service plan or warranty will be included in the transaction. At 730, the dealer match engine 702 can be configured to compare the probability of inclusion of an extended service plan inclusion with specified dealer minimum service plan probability thresholds. Alternatively, if the buyer has indicated inclusion and type of a service plan or warranty, the dealer match engine 702 can be configured to compare the existence and type of service plan and/or warranty with the specified dealer minimum service plan requirements.

In some embodiments, at 732 and 734, the dealer match engine 702 can be configured to identify the vehicle type of the vehicle being bought and compare that type with dealer acceptable type prerequisites. In other words, the dealer match engine can determine whether the vehicle type matches a vehicle type for which a dealer has specified that it can execute transactions.

In some embodiments, transactions terms such as extended service contracts, warranties, trade-in value, are added, at a pre-matching stage, to the transaction price, such that the sales margin is altered and the dealer matching system is not required to perform some of the calculations described herein. In some embodiments, one or more transaction terms may be negotiated between the dealer and buyer at or before the time of transaction execution. In some embodiments, based on the determinations and calculations made at 708-734, the dealer match engine can be configured to calculate a dealer match score for each dealer at 736. In some embodiments, when threshold transaction criteria values are not met, some dealers may be removed entirely from a list of potential dealers to complete the transaction. In some embodiments, no dealer match score is calculated, and all unremoved dealers are matched.

In some embodiments, at 738, the plurality of dealers can be filtered based on the generated dealer match score for each of the plurality of dealers to identify a first set of dealers having a generated dealer match score above a predetermined threshold level.

In some embodiments, at 740, the platform can transmit electronically a dynamically generated computer notification to the first set of dealers, the dynamically generated computer notification configured to activate a remote subscriber computer and to enable connection via a URL over a computer network connection to a data source comprising data about the used vehicle transaction.

In some embodiments, the dealer match engine and the electronic transmission can be automated, such that the plurality of dealers provide a series of inputs corresponding to transaction criteria, a given transaction's term will be compared against these inputs to determine if they are acceptable for each dealer, and if the terms are acceptable, the platform can automatically transmit the dynamically generated computer notification to each dealer which deemed the terms acceptable. In some embodiments, the buyer is prompted to select their preferred dealer from the list of matched dealers to send the electronic transmission. In some embodiments, the platform can be configured to allow the first set of dealers to bid on the transaction, such that the lowest bidder, based on, for example, sales margin or price to execute the transaction, of the first set of dealers can be selected to execute the transaction. In some embodiments, an electronic notification can be sent to dealers notifying them of the used vehicle transaction and soliciting fulfillment bids to serve as the dealer for the transaction. In some embodiments, the fulfillment bids may comprise a minimum price that the dealer will charge for receiving delivery of the vehicle and executing the transaction.

In some embodiments, at 742, the platform can receive, over the computer network connection, an electronic confirmation from a first dealer in the first set of dealers, wherein the electronic confirmation activates access to data at 744, from a transaction database 742, for completing the used vehicle transaction, wherein the data is accessible only by the first dealer to activate the electronic confirmation through the computer network connection.

In some embodiments, the platform is configured to electronically transmit completed transaction information one or more consignors that will notify the consignors regarding the status of pending or completed sales of one or more consignor vehicles.

Figure 8:
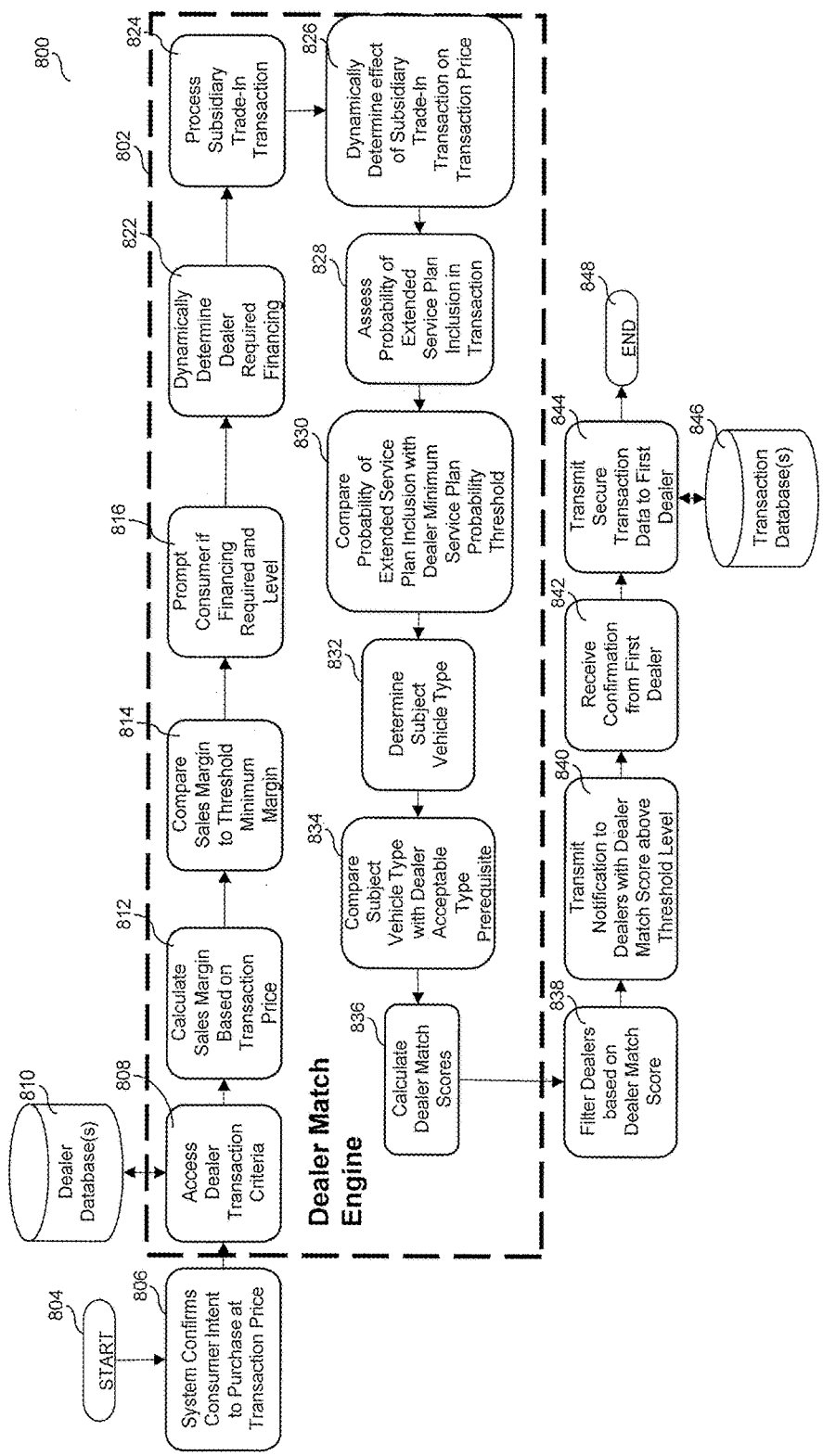
FIG. 8 is a flow chart illustrating another example embodiment of a dealer matching system of the dynamically updated used vehicle marketing and sales platform disclosed herein.

FIG. 8 is a flow chart illustrating another example embodiment of a dealer matching system of the of the used vehicle marketing and sales platform. The example embodiment of FIG. 8 includes some or all of the features of the example embodiment of FIG. 7. However, in the example embodiment of FIG. 8, instead of dynamically determining a probability that financing will be required, the dealer match engine can prompt the consumer/buyer/user to indicate if financing is required and what level of financing is required in the transaction at 816. Similar modifications can be made to the dealer match engine, such that it can be configured to prompt the user to select transaction terms instead of determining various probabilities, such as, for example, the probability that the user will include an extended service plan or warranty in the transaction at 828. In those embodiments, the indicated transaction term (e.g. financing level or selected extended service plan) can then be compared with a minimum threshold transaction criteria (e.g. minimum financing level or minimum required service plan) rather than a minimum threshold transaction probability criteria.

Figure 9:
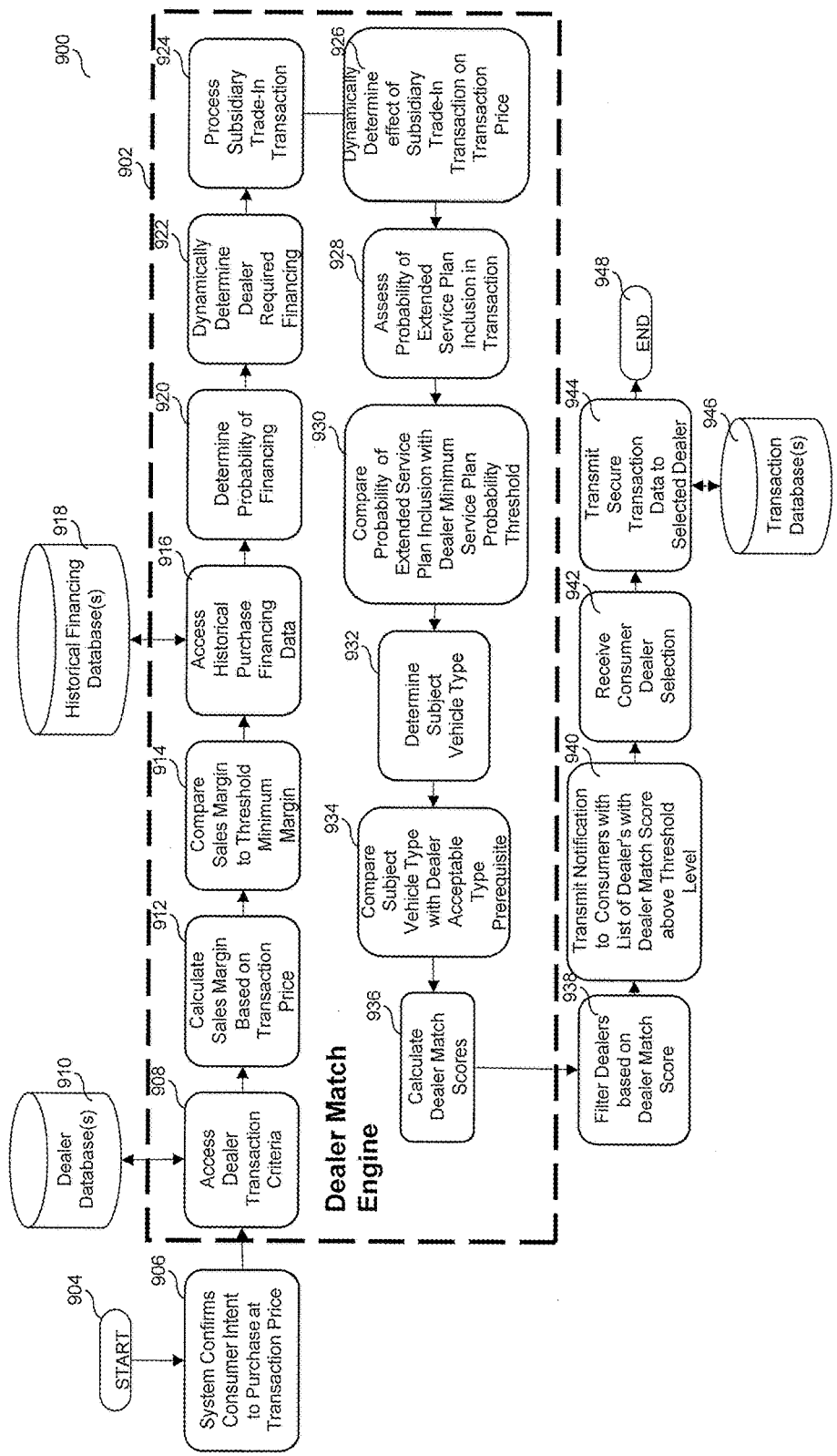
FIG. 9 is a flow chart illustrating another example embodiment of a dealer matching system of the dynamically updated used vehicle marketing and sales platform disclosed herein.

FIG. 9 is a flow chart illustrating another example embodiment of a dealer matching system of the used vehicle marketing and sales platform. The example embodiment of FIG. 9 includes some or all of the features of the example embodiments of FIGS. 7 and 8 described above. However, in the example embodiment of FIG. 9, instead of electronically transmitting a dynamically generated computer notification to the first set of dealers at 740, 840, a notification is instead sent to the buyer or consumer at 940. In some embodiments, this notification differs from the notification of the example embodiments of FIGS. 7 and 8, in that it may allow a buyer to select a preferred dealer from a list of matched dealers to execute the transaction. In some embodiments, at 942, the platform is configured to receive, over the computer network connection, an electronic dealer selection from the buyer. In some embodiments, the electronic dealer selection activates access to data at 944, from a transaction database 946, for completing the used vehicle transaction, wherein the data is accessible only by the buyer selected dealer.

Figure 10:
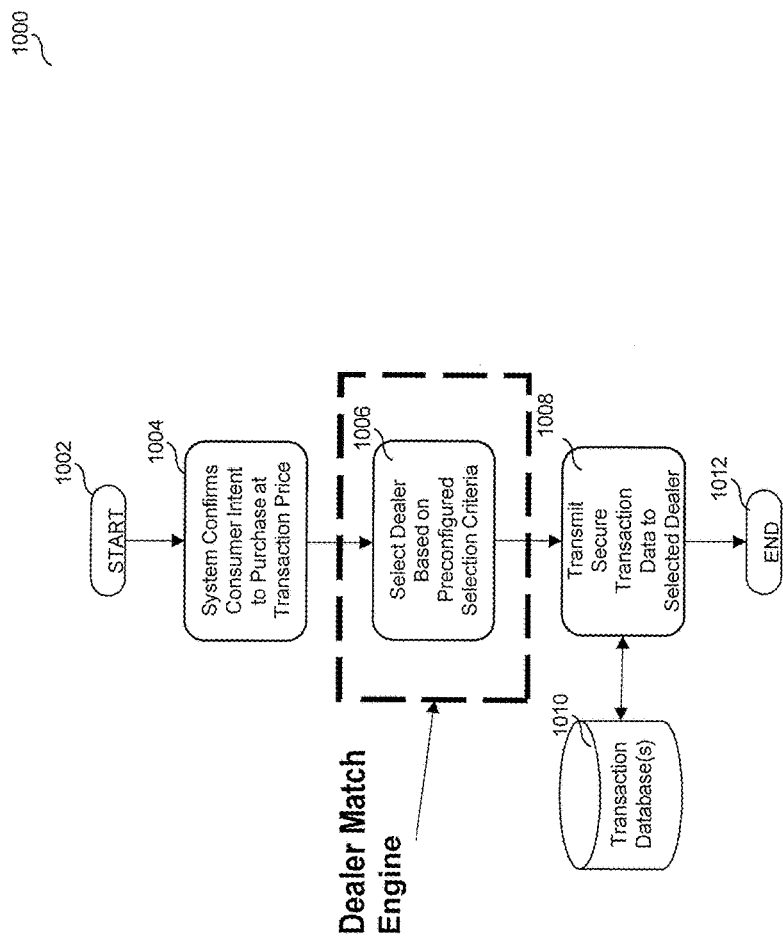
FIG. 10 is a flow chart illustrating another example embodiment of a dealer matching system of the dynamically updated used vehicle marketing and sales platform disclosed herein.

In other embodiments, the dealer matching system can be configured to select a dealer solely based on a preconfigured selection criteria, as shown in the example embodiment of the flowchart in FIG. 10. In some embodiments, the dealer matching system of the of the used vehicle marketing and sales platform can be configured to select a dealer solely based on the dealer's physical proximity to a user. In other embodiments, the dealer matching system can be configured to select a dealer solely based on a user's preconfigured preference.

Figure 11:
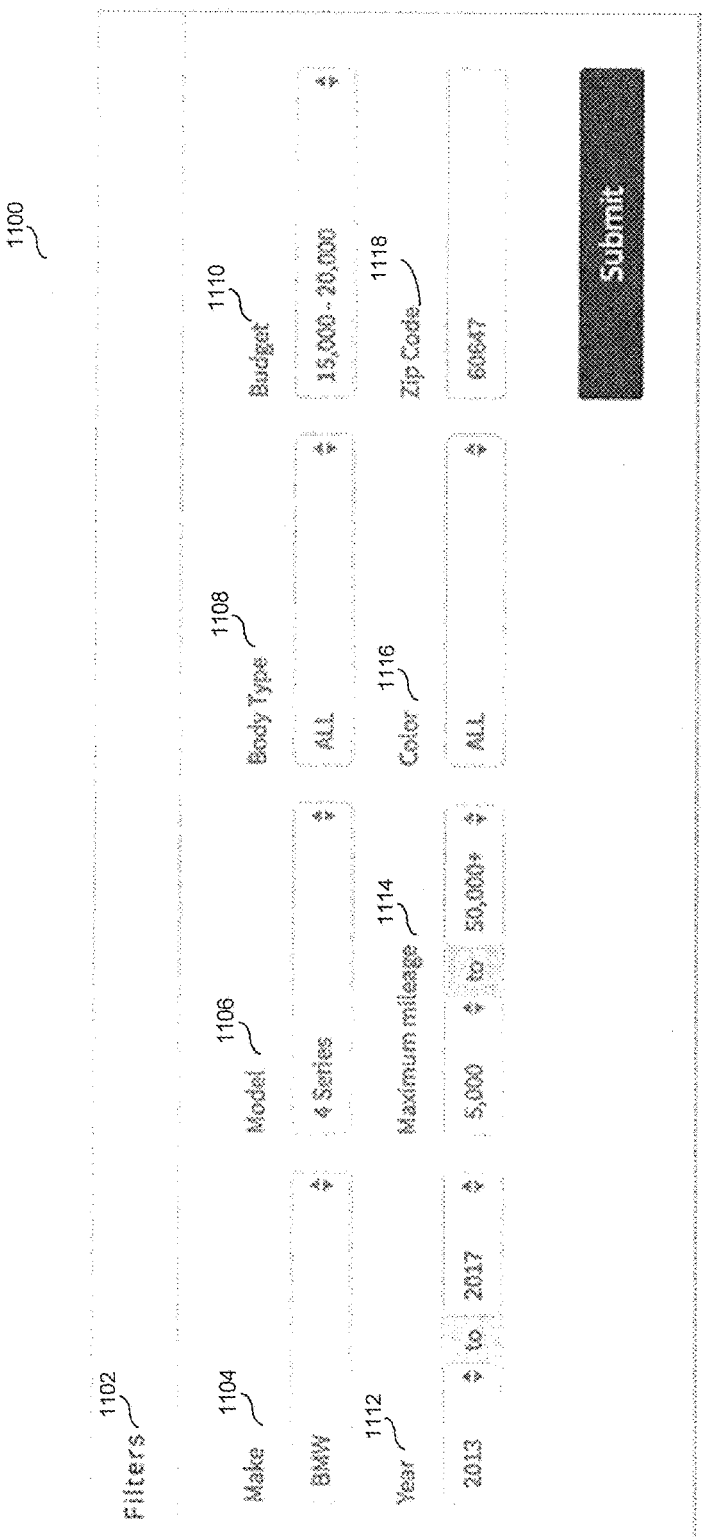
FIG. 11 is a diagram of an example embodiment of a user interface for a used vehicle search of the dynamically updated used vehicle marketing and sales platform disclosed herein.

FIG. 11 is a diagram of an example embodiment of a user interface for conducting a used vehicle search on the used vehicle marketing and sales platform. The user interface 1100 may comprise various search parameters or filters 1102, including, for example, make 1104, model 1106, body type 1108, user budget 1110, vehicle year range 1112, maximum mileage 1114, color 1116, and/or zip code 1118. Other filters 1102 may include, for example, exterior color, interior color, price, location, age, date of availability, vehicle history, VIN, vehicle type, trim level, transmission type, engine type, fuel type, condition, and/or average user rating. In some embodiments, a used vehicle search can be conducted using between about 1 and 100 filters. In some embodiments, a used vehicle search can be conducted using between about 1 and 5 filters. In some embodiments, a used vehicle search can be conducted using about 1, 2, 3, 4, 5, 6, 7, 8, 9, 10, 15, 20, 25, 30, 35, 40, 45, 50, 55, 60, 65, 70, 75, 80, 85, 90, 95, and/or 100 filters, or any value in between the aforementioned values.

Figure 12:
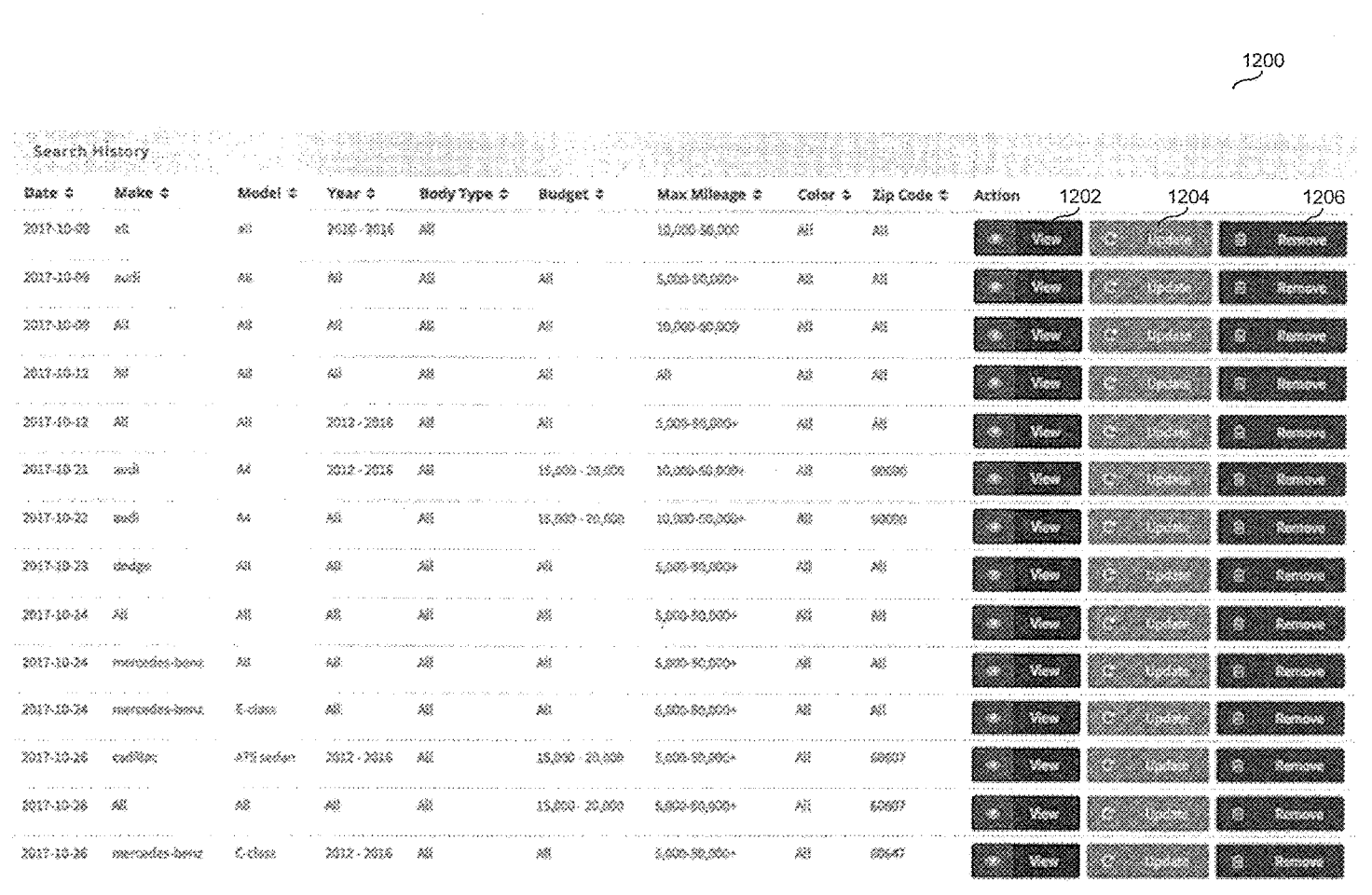

FIG. 12 is a diagram of an example embodiment of a user interface for a used vehicle search history on the used vehicle marketing and sales platform. In some embodiments, the used vehicle marketing and sales platform may allow a user to view previous search results through a "view" or similar function 1202. In some embodiments, the used vehicle marketing and sales platform may allow a user to rerun or update a search query using an "update" or similar function 1204. In some embodiments, the used vehicle marketing and sales platform may allow a user to delete previous searches from the user interface using a "delete" or similar feature 1206.

Figure 13:
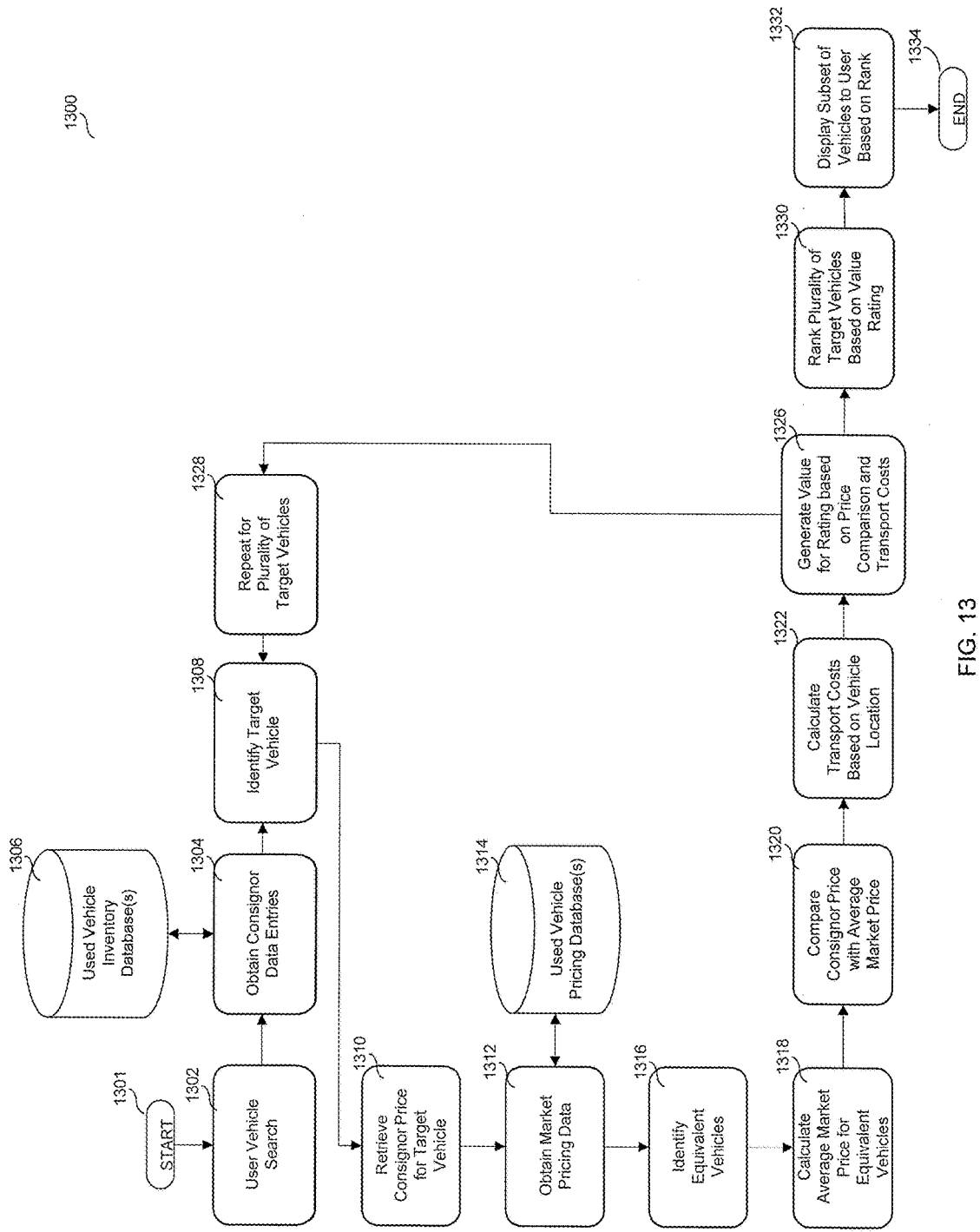
FIG. 13 is a flowchart illustrating an example embodiment of a used vehicle ranking system for use in the systems, methods, and devices disclosed herein.

FIG. 13 is a flowchart illustrating an example embodiment of a used vehicle ranking system for use in the systems, methods, and devices for marketing and selling used vehicles during an extended sale period and dynamically matching used vehicle dealers to used vehicle transactions disclosed herein.

In some embodiments, at 1302, the used vehicle marketing and sales platform described herein can be configured to receive a user search comprising search parameters as discussed above.

Using the user search parameters, the platform may obtain a plurality of consignor vehicle data entries at 1304, for one or more vehicle inventory databases 1306. In some embodiments, the used vehicle data entries contain information regarding consignor vehicles, including, for example, availability date, vehicle location, consignor price, vehicle type, vehicle features, and other data.

In some embodiments, at 1308, the used vehicle ranking system may identify, based on a comparison of the user search parameters and the information in the used vehicle data entries, a target vehicle. In some embodiments, after identifying the target vehicle, the used vehicle ranking system may obtain the consignor price at 1310 from the target vehicle's corresponding used vehicle data entry.

In some embodiments, at 1312, the vehicle ranking system may obtain, from one or more used vehicle pricing databases 1314, market pricing data for a plurality of currently available or previously sold vehicles. The vehicle ranking system can be configured to identify within the market pricing data, based on common characteristics or features, one or more equivalent vehicles to the target vehicle and the price of those equivalent vehicles at 1316. At 1318, the vehicle ranking system can calculate an average market price of the equivalent vehicles using averaging algorithms.

In some embodiments, at 1320, the vehicle ranking system can compare the consignor price of the target vehicle to the average market price of equivalent vehicles.

Furthermore, in some embodiments, at 1322, the vehicle ranking system can calculate an estimated transport cost based on a comparison of the target vehicle location, obtained from the target vehicle data entry from the one or more vehicle inventory databases 1306, and the user location, obtained from user input, GPS functionality, or otherwise.

Using the price comparison and the estimated transport cost, at 1326, the vehicle ranking system can compute a value rating for the target vehicle.

At 1328, the system can repeat the aforementioned process for a plurality of target vehicles. The number of target vehicles for which the value rating is computed can be based on a predetermined amount or dynamically determined based on the value ratings computed by the system so far. For example, if the used vehicle ranking system has already obtained an excess amount of high value rating target vehicles, it may terminate the cycle. In other embodiments, value ratings may be calculated for every identified equivalent vehicle.

In some embodiments, at 1330, the vehicle ranking system may rank the plurality of target vehicles for which a value rating has been computed. A subset or the entire set of the ranked target vehicles can then be displayed, at 1332, through a dynamic user interface, to the user, the subset determined based on rank.

Figure 14:
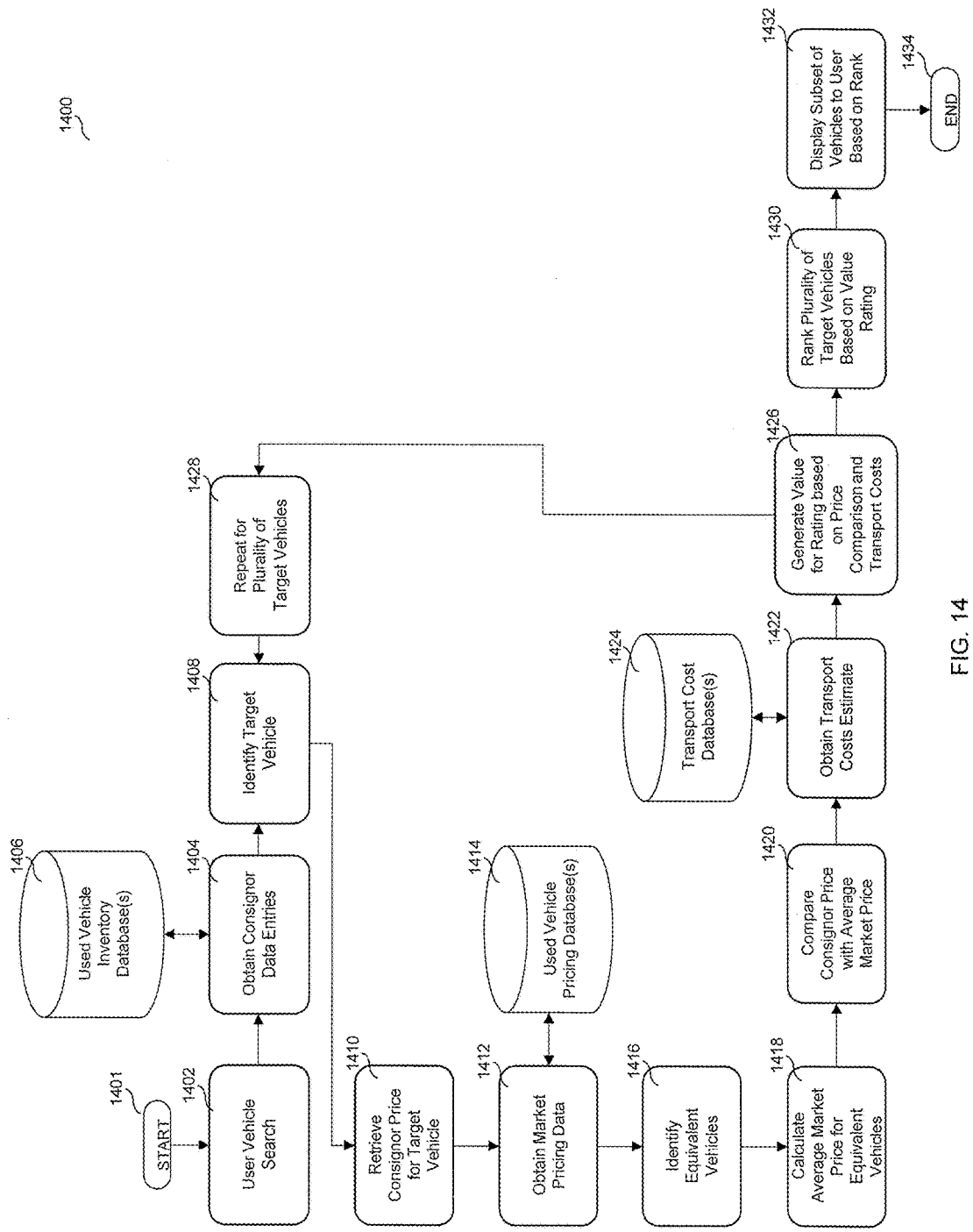
FIG. 14 is a flowchart illustrating another example embodiment of a used vehicle ranking system of the systems, methods, and devices disclosed herein.

FIG. 14 is a flowchart illustrating another example embodiment of a used vehicle ranking process of the systems, methods, and devices for marketing and selling used vehicles during an extended sale period and dynamically matching used vehicle dealers to used vehicle transactions disclosed herein.

The example embodiment of FIG. 14 includes some or all of the features of the example embodiment of FIG. 13 described above. However, the example embodiment of FIG. 14 may include one or more transport cost databases 1424, which may connect directly into the systems of one or more third-party logistics providers. In some embodiments, the one or more transport cost databases 1424 can provide transport cost estimates based on the location of the target vehicle and the location of the user provided by the system. The system, at 1422 can obtain the transport cost estimates.

Figure 15:
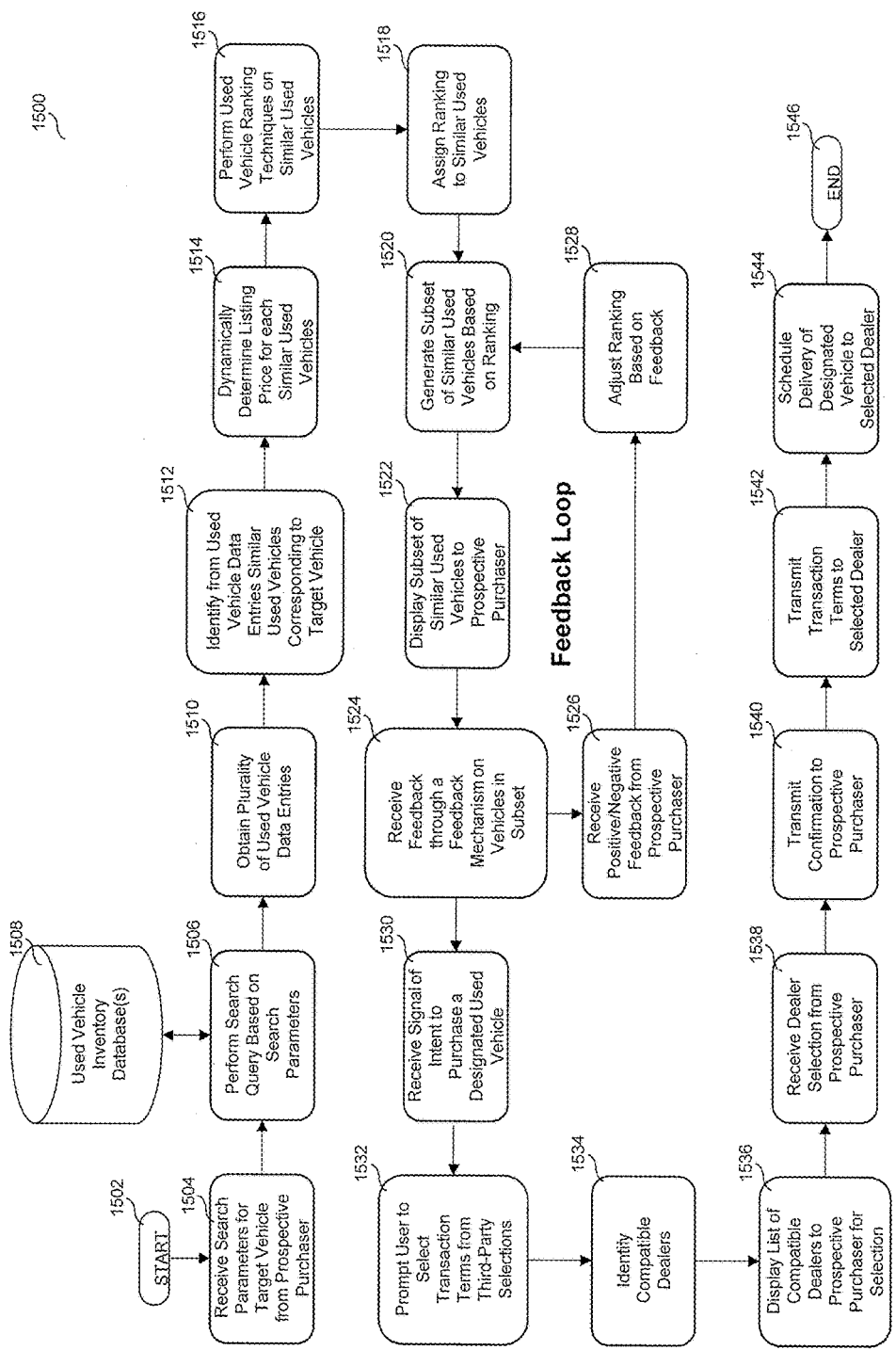
FIG. 15 is a flowchart illustrating another example embodiment of a used vehicle marketing and selling process of the dynamically updated used vehicle marketing and sales platform disclosed herein.

FIG. 15 is a flowchart illustrating another example embodiment of a used vehicle marketing and selling process for facilitating a sale of a used vehicle to a prospective purchaser.

The used vehicle marketing and sales platform may, at 1504, receive, from the prospective buyer or purchaser, search parameters for a target vehicle. These search parameters may include, for example, vehicle make, vehicle model, exterior color, interior color, price, body type, mileage, location, age, date of availability, vehicle history, VIN, vehicle type, trim level, transmission type, engine type, fuel type, condition, user rating, and/or other features. In response to receiving the search parameters, the platform may conduct a vehicle search at 1506 by performing a search engine query across one or more vehicle inventory databases based on the received search parameters. In performing the search, the platform may obtain a plurality of used vehicle data entries at 1510.

In some embodiments, the platform may be configured to identify, within the plurality of used vehicle data entries, one or more similar used vehicles at 1512, based on a comparison of the search parameters with various vehicle characteristics and features described herein. In some embodiments, at 1514, the platform may dynamically determine a listing price for each of the similar used vehicles using, for example, the vehicle listing price system described herein. In some embodiments, at 1516, the platform may perform used vehicle rankings techniques on the similar used vehicles to assign a ranking at 1518 using, for example, the vehicle ranking system described herein. In some embodiments, at 1520, the used vehicle marketing and sales platform can generate a subset of the ranked similar vehicles, wherein the subset can be generated based on the relative ranking of the similar vehicles.

In some embodiments, at 1522, the platform can be configured to display the generated subset of used vehicles to a prospective purchaser through the dynamic user interface along with one or more feedback mechanisms corresponding to each displayed vehicle. In some embodiments, at 1524, the platform can be configured to receive feedback for one or more of the similar vehicles of the subset through the one or more feedback mechanisms. At 1526, the feedback received can comprise either positive or negative feedback from a prospective purchaser. In some embodiments, at 1528, the platform can be configured to adjust the ranking of the similar vehicles not included in the subset based on the feedback received from the user on the vehicles within the first subset. Based on the adjusted rankings, a new subset can be generated at 1520 and the process can be repeated until the system receives a signal of intent to purchase a designated vehicle of the one of the similar vehicles at 1530.

In some embodiments, at 1532, the platform can prompt a user to select transaction terms from a plurality of available purchase selections generated by the platform and/or third-party services. In some embodiments, the transaction terms are those discussed above in relation to the dealer matching system. In some embodiments, at 1534, the platform can be configured to identify available dealers using, for example, the dealer matching system described herein.

In some embodiments, at 1536, the platform can be configured to display, to the prospective purchaser, the list of identified dealers using, for example, an electronically transmitted computer notification as described herein. In some embodiments, at 1538, the platform is configured to receive, over the computer network connection, an electronic dealer selection from the buyer. In some embodiments, at 1540, the platform can be configured to electronically transmit purchase confirmation to the prospective purchaser. In some embodiments, the electronic dealer selection activates access to transaction terms data, at 1542, for completing the used vehicle transaction, wherein the data is accessible only by the buyer selected dealer. In some embodiments, at 1544, the platform can be configured to schedule delivery of the designated vehicle to the selected dealer through, for example, a third-party logistics provider.

Figure 16:
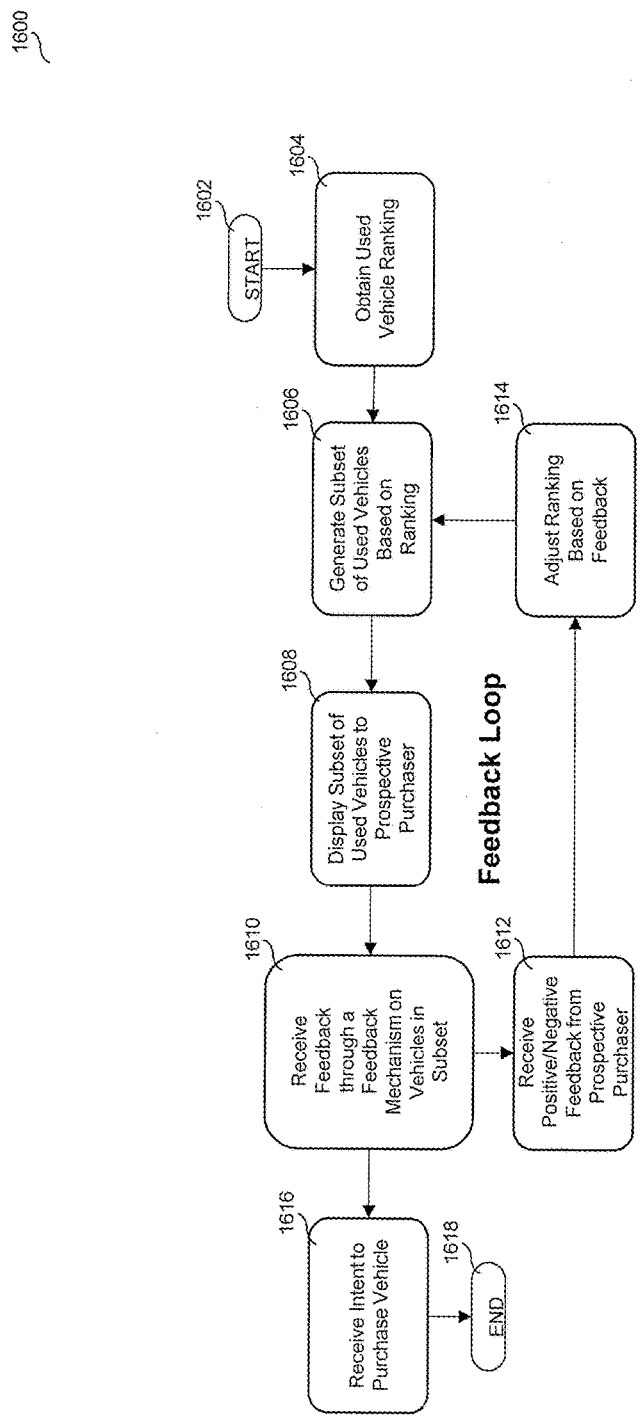
FIG. 16 is a flowchart illustrating an example embodiment of a feedback system of the dynamically updated used vehicle marketing and sales platform disclosed herein.

FIG. 16 is a flowchart illustrating an example embodiment of a feedback loop of the used vehicle marketing and sales platform.

At 1604, the feedback system 1600 can obtain a used vehicle ranking from, for example, the used vehicle ranking system described above. At 1606, the used vehicle marketing and sales platform can generate a subset of the ranked vehicles, wherein the subset can be generated based on the relative ranking of the ranked vehicles.

In some embodiments, at 1608, the platform can be configured to display the generated subset of used vehicles to a prospective purchaser through the dynamic user interface along with one or more feedback mechanisms corresponding to displayed vehicle. In some embodiments, the feedback mechanisms comprise binary selection tools. In some embodiments the binary selection tools comprise a "thumbs up" indicating positive feedback and a "thumbs down" indicating negative feedback. However, in other embodiments, the binary selection tool could be displayed or implemented in various other forms such as, for example, haptic swiping up/down or left/right, green/red buttons, or otherwise.

In some embodiments, at 1610, the feedback system 1600 can be configured to receive feedback for one or more of the vehicles of the subset through the one or more feedback mechanisms. At 1612, the feedback received can comprise either positive or negative feedback from a prospective purchaser. In some embodiments, at 1612, the platform can be configured to adjust the ranking of the vehicles not included in the subset based on the feedback received from the user on the vehicles within the first subset. Based on the adjusted rankings, a new subset can be generated at 1606 and the process can be repeated until the system receives a manifestation of intent to purchase one of the vehicles at 1616.

In some embodiments, the feedback system can be configured to provide initial subset of vehicles having a broad range of types, characteristics, and features. Based on user feedback, the platform can be configured to provide subsequent vehicle subsets with a narrower range of types, characteristics, and features.

In some embodiments, the platform is further configured to aggregate feedback data from a plurality of users to identify trends or patterns in user feedback. In some embodiments, these trends or patterns can be utilized to guide the vehicle ranking system described herein and influence which vehicles are displayed to individual users. For example, if a specific make or model vehicle receives a significantly above average percentage of positive feedback activations, the system may adjust a ranking or suggestion algorithm in response. In some embodiments, the platform can be configured to recognize trends or patterns in user feedback based on more nuanced features than vehicle make and model. For example, the system can be configured to recognize trends positive feedback for vehicles with certain features or characteristics such as, for example, exterior color, interior color, price, body type, mileage, location, age, date of availability, vehicle history, vehicle type, trim level, transmission type, engine type, fuel type, condition, and user rating, and other vehicle features. In some embodiments, the platform can be configured to utilize artificial intelligence and/or machine learning technologies to further refine the vehicle ranking system and its adjustments to feedback trends. In some embodiments, the platform can be configured to display vehicles having no or few characteristics matching a first set of search parameters inputted by prospective purchasers and request feedback on those vehicles. If those vehicles receive positive feedback, they may be displayed more frequently to other prospective purchasers who input similar search parameters as the first set of search parameters.

Figure 17:
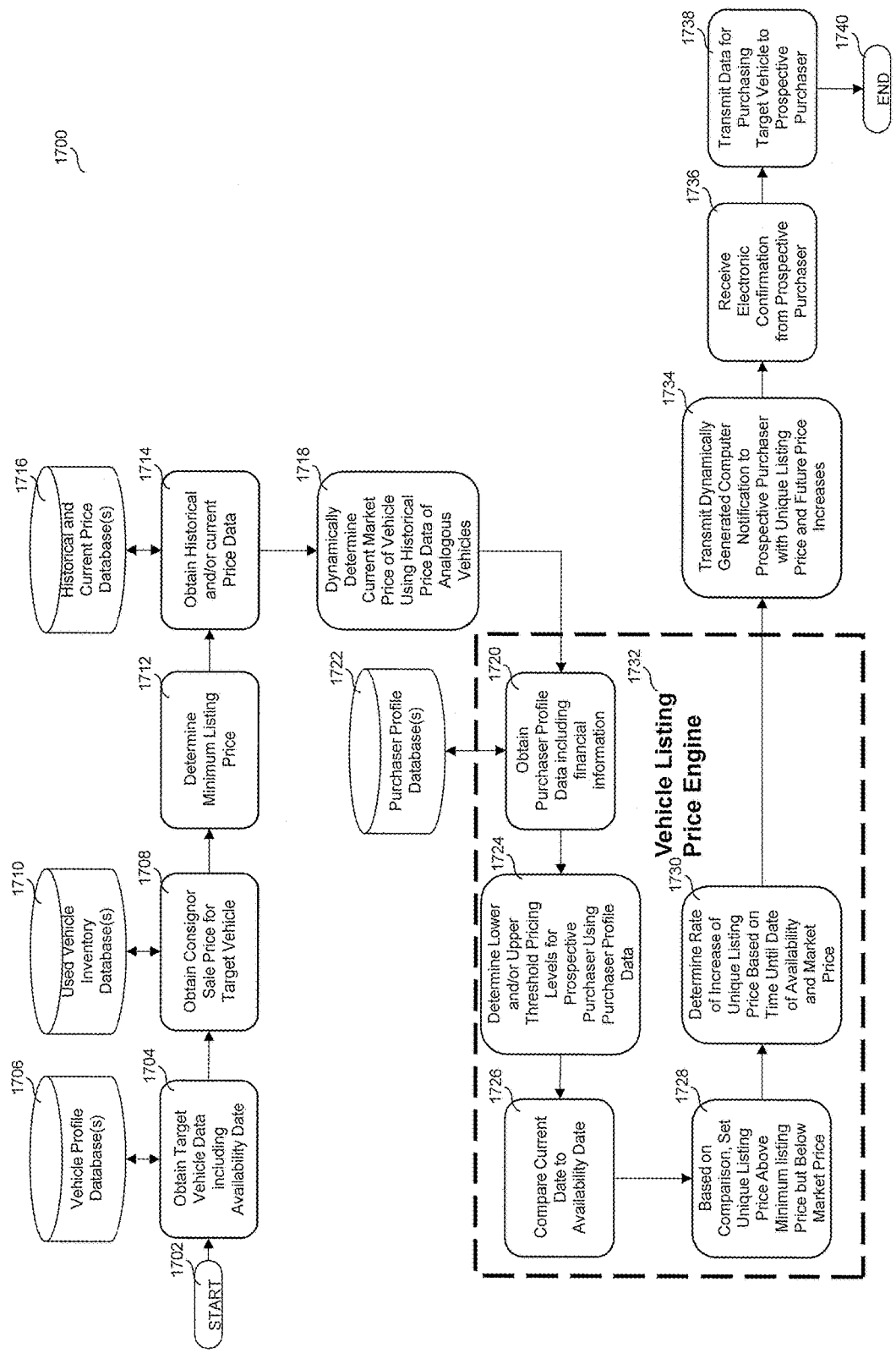
FIG. 17 is a flowchart illustrating an example embodiment of a dynamic vehicle listing price system of the dynamically updated used vehicle marketing and sales platform disclosed herein.

FIG. 17 is a flowchart illustrating an example embodiment of a dynamic vehicle listing price system for the used vehicle marketing and sales platform. The dynamic vehicle listing price system may facilitate used vehicle transactions in the Pre-Gray period and/or Gray period such that the platform can market and sell used vehicles in an extended sale period relative to other systems.

The used vehicle marketing and sales platform may, at 1704, obtain target vehicle data from one or more vehicle profile databases 1706 configured to store a plurality of vehicle profiles corresponding to a plurality of vehicles. In some embodiments, the target vehicle data can include an availability date at which the target vehicle will no longer be in use by the consignor, and current vehicle location. At 1708, the platform may obtain, from one or more used vehicle inventory databases 1710, a consignor price for the target vehicle. In some embodiments, the consignor price represents the minimum value that a consignor would accept for a target vehicle. Based on the consignor price, the platform may determine a minimum listing price at 1712, wherein the minimum listing price may represent the lowest possible price that the vehicle can be sold at a profit. In some embodiments, the minimum listing price may correspond to a minimum threshold sales margin.

In some embodiments, at 1714, the platform can be configured to obtain historical and/or current pricing data from one or more price databases 1716 configured to store historical and/or current market pricing data corresponding to a plurality of completed and/or current used vehicle listings. In some embodiments, based on the historical and/or current pricing data and the vehicle location, the platform can be configured to dynamically determine the current market price of the target vehicle.

In some embodiments, the platform comprises a vehicle listing price engine 1732 configured to dynamically determine a plurality of unique listing prices, each unique listing price of the plurality of listing prices corresponding to each of the plurality of prospective purchasers for each of the plurality of vehicles.

The vehicle listing price engine 1732 may, at 1720, obtain, from one or more purchaser profile databases 1722 configured to store a plurality of purchaser profile data, the purchaser profile data comprising one or more of financial, desired vehicle identification, and contact information corresponding to a plurality of prospective purchasers, purchaser profile data for prospective purchasers. In some embodiments, based on the purchaser profile data, the vehicle listing price engine 1732, at 1724, can determine upper and/or lower threshold pricing levels for each prospective purchaser.

In some embodiments, the vehicle listing price engine 1732, at 1726, may compare the current date to the availability date of the target vehicle. Based on the date comparison, the vehicle listing price engine 1732 can dynamically calculate a unique listing price at 1728. In some embodiments, the unique listing price can be higher than the minimum listing price determined by the platform. In some embodiments, the unique listing price can be lower than the determined market price of the target vehicle, and can be dynamically displayed alongside the determined market price to the user. In other embodiments, the unique listing price may be higher than the determined market price. For example, vehicles having rare or premium features, vehicles whose historical price trajectory has risen recently, vehicles who are in high demand, or other vehicles may have a unique listing price higher than the determined market price. In some embodiments, the unique listing price can also depend on various other factors, such as, for example, vehicle location, transport costs, vehicle type rarity, uniqueness of vehicle features, and other considerations. In some embodiments, the difference between the unique listing price and the minimum listing price is smaller when the present date is relatively temporally remote from the availability date, and the difference between the unique listing price and the minimum listing price is increased incrementally as the current date approaches the availability date.

In some embodiments, the vehicle listing price engine 1732 can be further configured to dynamically determine purchaser-unique incremental price increases for the target vehicle at 1730. The incremental price increases may be based on various factors including, for example, the difference between the current date and the availability, the difference between the current date and the auction date, vehicle make, vehicle model, exterior color, interior color, price, body type, mileage, location, age, date of availability, vehicle history, VIN, vehicle type, trim level, transmission type, engine type, fuel type, condition, and user rating. In some embodiments, the vehicle listing price engine 1732 can be configured to generate a single unique listing price that is not incrementally increased over time.

In some embodiments, the vehicle pricing engine is utilized during the Gray period to calculate a unique listing price and to calculate incremental price increases as the auction date approaches. In some embodiments, the vehicle pricing engine is utilized during the Pre-Gray period to calculate a unique listing price and to calculate incremental price increases as the availability date approaches. In some embodiments, the platform can be configured to arrange delivery of a vehicle at or after a future availability date if the vehicle is purchased through the platform before the availability date. In some embodiments, the platform can be configured to determine whether and when to list a vehicle on the platform based on a comparison of the current date with a future availability or auction date.

In some embodiments, the platform is configured to transmit electronically, a dynamically generated computer notification at 1734, the dynamically generated computer notification displayed through the dynamic user interface, to the prospective purchaser, wherein the dynamically generated computer notification is configured to activate a remote subscriber computer and to enable connection via a URL over a computer network connection to a data source comprising data about the unique listing price.

In some embodiments, the platform is configured to receive, at 1736, over the computer network connection, an electronic confirmation from the prospective purchaser, wherein the electronic confirmation activates access to data at 1738 for purchasing the target used vehicle, wherein the data is accessible only by the prospective purchaser. In some embodiments, after receiving purchase confirmation from the prospective purchaser, the platform can be configured to determine whether the vehicle is still available for sale by, for example, accessing the one or more used vehicle inventory databases 1710.

In some embodiments, the platform can be further configured to determine whether a vehicle is still available for sale such that is eligible for listing through the platform. For example, the platform may connect with a consignor system database, retrieve vehicle data, including, for instance, the vehicle availability date and the auction date, estimate the stage at which the vehicle is in the wholesale/auction process, and determine the price of the vehicle at that stage of the process. In some embodiments, the platform can estimate whether it is still feasible to sell the vehicle. For example, the platform may dynamically estimate, based on auction information, if fees incurred thus far in the auction process are excessive such that the vehicle is no longer marketable to a buyer based on the purchaser information obtained from one or more purchaser profile databases 1722. In some embodiments, a vehicle may be locked into the auction process such that the platform will no longer market the vehicle to buyers. In some embodiments, the platform can be configured to dynamically determine the time at which a vehicle will become locked into the auction process, and to dynamically adjust the listing price in order to incentivize purchase of the vehicle before the lockout date. In some embodiments, the platform can be configured to determine the probability that a vehicle will not sell at auction and further estimate a reduction in price from a wholesaler. In some embodiments, this probability and estimated reduction can be utilized by the unique vehicle listing price engine in calculating the listing price. In some embodiments, the platform can be configured to estimate the probability that a consignor will reduce the price of a vehicle and can use this estimate in generating a unique listing price for the vehicle.

In some embodiments, the platform can be further configured to access used vehicle availability data from one or more auction databases. In some embodiments, the used vehicle availability data can comprise information regarding vehicles currently in the auction process. In other words, the system can obtain vehicle data not only from consignor inventory databases but also auction databases. In addition, the used vehicle availability data from auction databases can comprise auction location and timing information, such that the system can determine when and where the vehicles will be sold. Using this data, along with historical transaction data, the system can determine whether or not to display a given vehicle to users for purchase.

In some embodiments, the platform can be configured to connect auction inventory to the platform and/or to third-party dealer systems, such that the used vehicles in the auction inventory can be directly marketed and sold to consumers through the used vehicle marketing and sales platform described herein or the third-party dealer systems. The various systems described herein, including, for example, the vehicle ranking system, the dealer matching system, and the vehicle price listing system, are equally applicable to used vehicles obtained through auction inventory databases.

Figure 18:
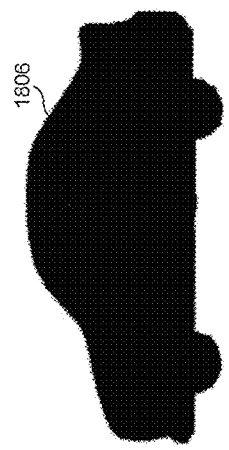
FIG. 18 is a diagram illustrating example embodiments of consumer expertise indicators for the dynamically updated used vehicle marketing and sales platform disclosed herein.
Figure 18:
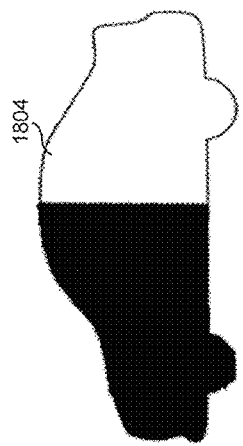
Figure 18:
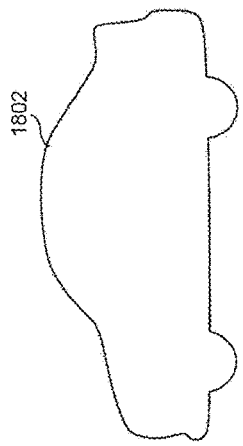

FIG. 18 is a diagram illustrating example embodiments of consumer expertise indicators for the systems, methods, and devices disclosed herein. In some embodiments, the consumer expertise indicator functions by dynamically displaying a consumer expertise signal configured to illustrate a user's level of knowledge with a used vehicle market. In some embodiments, the system measures a user's level of knowledge based on the number of user activations of a feedback mechanism, wherein the consumer expertise signal is updated upon each activation of the feedback mechanism.

For example, consumer expertise indicators 1802, 1804, and 1806 may be displayed at different times through the dynamic user interface of the used vehicle marketing and sales platform. In some embodiments, before or at the beginning of a user search, the dynamic user interface may display unfilled consumer expertise indicator or signal 1802. In some embodiments, consumer expertise signal 1802 is an outline of a vehicle shape devoid of color or filling, indicating a consumer or prospective purchasers lack of familiarity or knowledge of the relevant vehicle market. In some embodiments, as the consumer spends more time on the platform, conducts additional searches, submits feedback through a feedback mechanism, purchases vehicles, or otherwise interacts with the system, the consumer purchase indicator 1802 may be updated to display, for example, consumer expertise indicator 1804 and eventually consumer expertise indicator 1806. In some embodiments, the level color or filling represents the level of consumer expertise. Thus, for example, consumer expertise indicator 1804 may indicate that the consumer is about familiar with the used vehicle market but is not yet an expert, while consumer expertise indicator 1806 may indicate a high level of knowledge, understanding, or expertise of the market. In some embodiments, the level of expertise represented by the consumer expertise indicators can be based on a user's level of interaction with the systems, methods, and devices herein.

Figure 19:
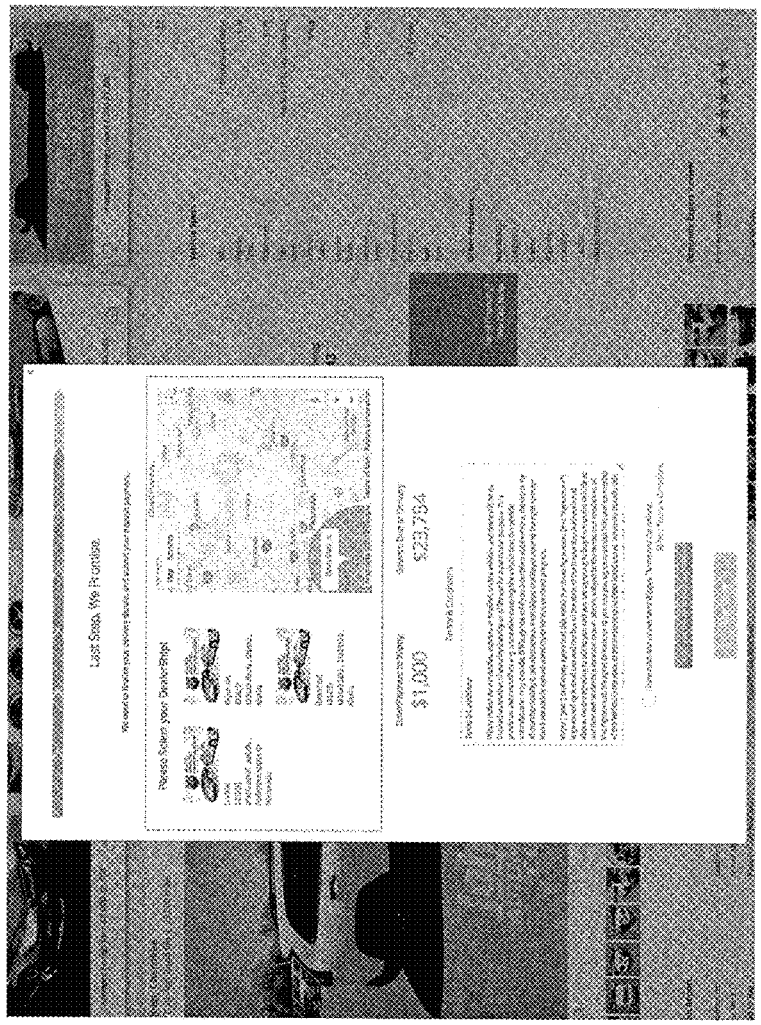
FIG. 19 is a diagram of an example embodiment of a user interface for transaction terms and dealer selection of the dynamically updated used vehicle marketing and sales platform disclosed herein.

FIG. 19 is a diagram of an example embodiment of a user interface for transaction terms and dealer selection of the systems, methods, and devices disclosed herein. A dynamic user interface 1900 may display a list of matched dealers generated by the dealer matching system described above. In some embodiments, the generated list may be updated dynamically based on the physical location of the user, which can be determined, for example, by the GPS functionality of a mobile device and/or user input. In some embodiments, the dynamic user interface can display a map overlay that can display the user's current location and/or the location of the dealers in the generated list. Additionally, in some embodiments, the dynamic user interface 1900 can display the final transaction terms and conditions and prompt the user final acceptance.

Figure 20:
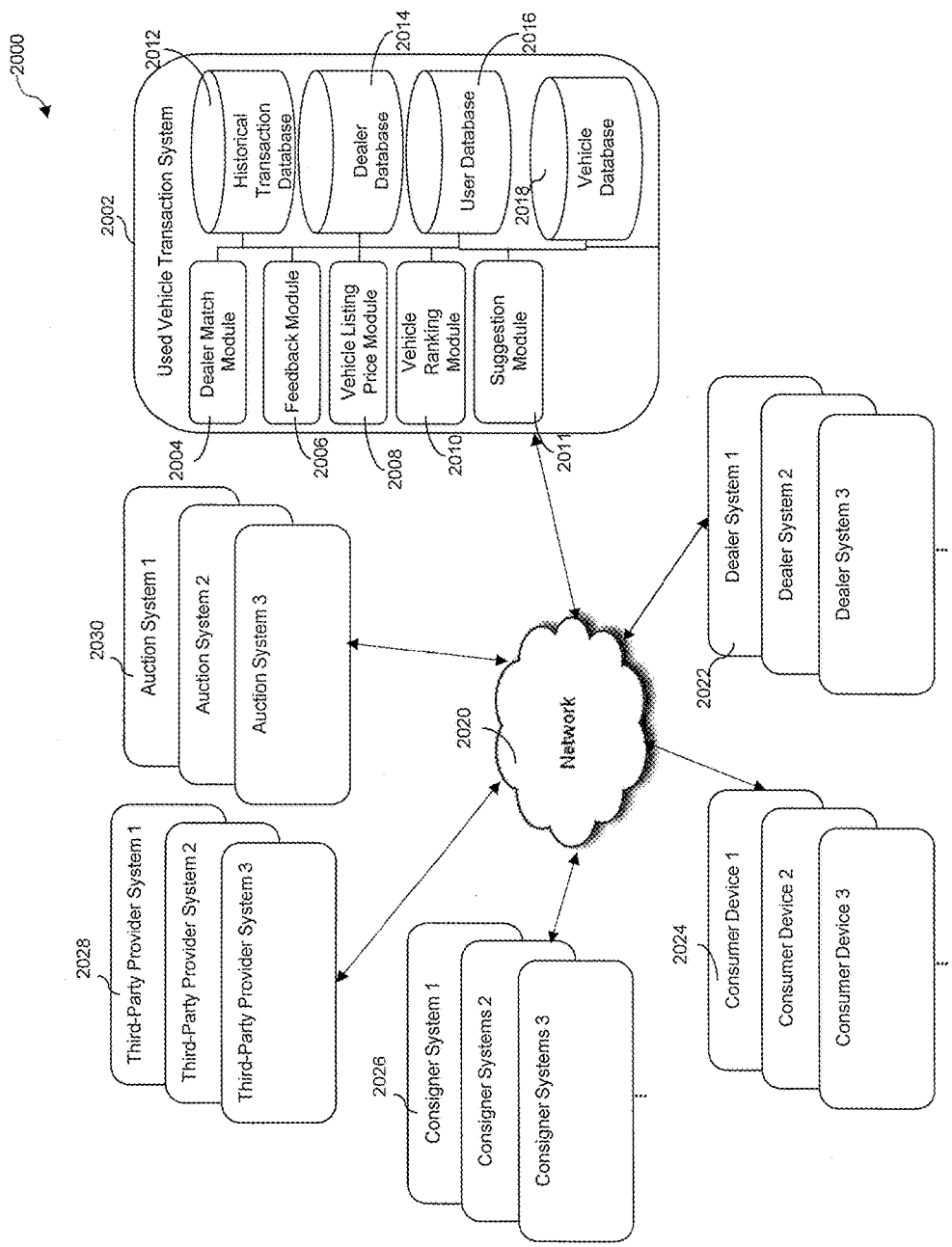
FIG. 20 is a block diagram illustrating an example embodiment of a computer system configured to run software for implementing one or more embodiments of the used vehicle marketing and selling systems, methods, and devices disclosed herein.

FIG. 20 is a block diagram illustrating an example embodiment of a computer system configured to run software for implementing one or more embodiments of the used vehicle marketing and selling systems, methods, and devices disclosed herein. In some embodiments, the various systems, methods, and devices described herein may also be implemented in decentralized systems such as, for example, blockchain applications. For example, blockchain technology may be used to maintain updated vehicle inventory, user profile, vehicle profile, dealer profile, ownership, possession, delivery, logistics, market pricing, historical pricing, title, registration and/or financing databases or ledgers, dynamically generate, execute, and record purchase, financing, warranty, and/or service plan agreements, conduct dealer bidding, conduct vehicle auctions, perform searches, conduct dealer matching, determine pricing, and conduct any other functionalities described herein.

In some embodiments, a used vehicle transaction system 2002 may be comprised of a dealer match module 2004, a feedback module 2006, a vehicle listing price module 2008, a vehicle ranking module 2010, a suggestion module 2011, a historical transaction database 2012, a dealer database 2014, a user database 2016, and/or a vehicle database 2018. The used vehicle transaction system 2002 can be connected to a network 2020. The network 2020 can be configured to connect used vehicle transaction system 2002 to one or more dealer systems 2022, one or more consumer devices 2024, one or more consignor systems 2026, one or more third-party provider systems 2028, and/or one or more auction systems 2030.

The dealer match module 2004 may function by dynamically generating a dealer match score that provides a measure of dealer compatibility with a transaction based on the complete transaction terms and dealer-specified requirements. The feedback module 2006 may be configured to allow a user to indicate positive or negative feedback on the quality of the first exchange listing. The vehicle listing price module 2008 may be configured to dynamically determine a plurality of unique listing prices, each unique listing price of the plurality of listing prices corresponding to each of a plurality of prospective purchasers for each of a plurality of vehicles. The vehicle ranking module 2010 may function by computing a value rating for various vehicles and ranking the various vehicles based on the value rating or other factors described herein. The suggestion module 2011 may function by making vehicle recommendations based on, for example, historical purchase data, a calculated value rating, similarities to the target vehicle, and/or other considerations. Each of the modules can be configured to interact with each other and the databases discussed herein.

The historical transaction database 2012 can store historical transaction data and/or current availability data regarding a plurality of used vehicles. The dealer database 2014 can store dealer criteria and dealer information for use by the platform, including, for example, the dealer matching systems described herein. The user database 2016 may store user profile information for use by the platform, including, for example, the unique vehicle listing price systems described herein. The vehicle database 2018 may store vehicle information, such as make, model, age, mileage, and other vehicle features or characteristics described herein. Each of the databases can be configured to interact with each other and the modules discussed herein.

Figure 21:
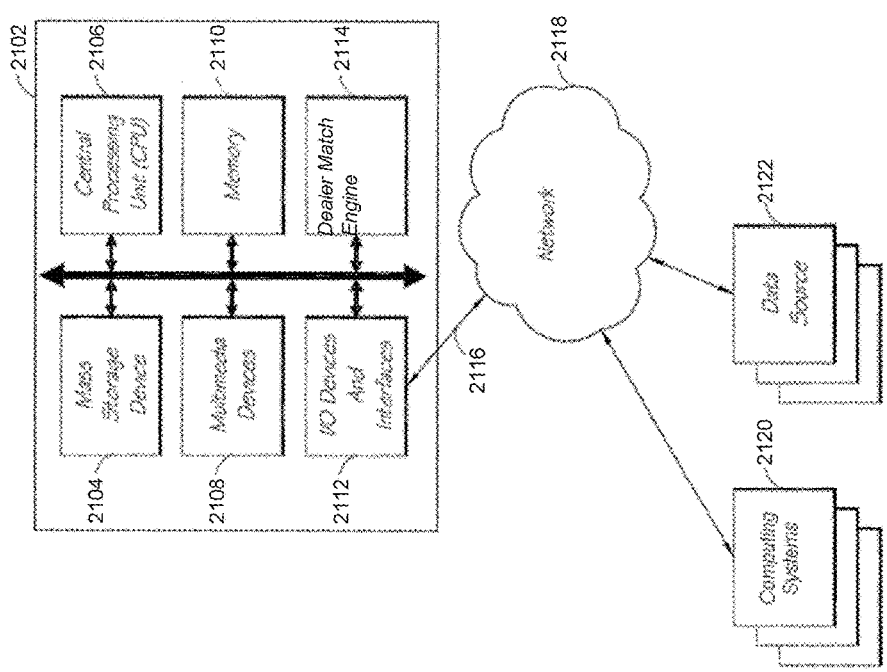
FIG. 21 is a block diagram illustrating an example embodiment of a computer system configured to run software for implementing one or more embodiments of the dealer matching systems, methods, and devices disclosed herein.

FIG. 21 is a block diagram depicting an embodiment of a computer hardware system configured to run software for implementing one or more embodiments of the used vehicle marketing and selling systems, methods, and devices disclosed herein.

In some embodiments, the systems, processes, and methods described herein are implemented using a computing system, such as the one illustrated in FIG. 21. The example computer system 2102 is in communication with one or more computing systems 2120 and/or one or more data sources 2122 via one or more networks 2118. While FIG. 21 illustrates an embodiment of a computing system 2102, it is recognized that the functionality provided for in the components and modules of computer system 2102 may be combined into fewer components and modules, or further separated into additional components and modules.

The computer system 2102 can comprise a dealer match engine module 2114 that carries out the functions, methods, acts, and/or processes described herein. The dealer match engine module 2114 is executed on the computer system 2102 by a central processing unit 2106 discussed further below.

In general, the word "module," as used herein, refers to logic embodied in hardware or firmware or to a collection of software instructions, having entry and exit points. Modules are written in a program language, such as JAVA, C or C++, PYPHON or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems and may be stored on or within any suitable computer readable medium or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 2102 includes one or more processing units (CPU) 2106, which may comprise a microprocessor. The computer system 2102 further includes a physical memory 2110, such as random access memory (RAM) for temporary storage of information, a read only memory (ROM) for permanent storage of information, and a mass storage device 2104, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 2102 are connected to the computer using a standards-based bus system. The bus system can be implemented using various protocols, such as Peripheral Component Interconnect (PCI), Micro Channel, SCSI, Industrial Standard Architecture (ISA) and Extended ISA (EISA) architectures.

The computer system 2102 includes one or more input/output (I/O) devices and interfaces 2112, such as a keyboard, mouse, touch pad, and printer. The I/O devices and interfaces 2112 can include one or more display devices, such as a monitor, that allows the visual presentation of data to a user. More particularly, a display device provides for the presentation of GUIs as application software data, and multi-media presentations, for example. The I/O devices and interfaces 2112 can also provide a communications interface to various external devices. The computer system 2102 may comprise one or more multi-media devices 2108, such as speakers, video cards, graphics accelerators, and microphones, for example.

The computer system 2102 may run on a variety of computing devices, such as a server, a Windows server, a Structure Query Language server, a Unix Server, a personal computer, a laptop computer, and so forth. In other embodiments, the computer system 2102 may run on a cluster computer system, a mainframe computer system and/or other computing system suitable for controlling and/or communicating with large databases, performing high volume transaction processing, and generating reports from large databases. The computing system 2102 is generally controlled and coordinated by an operating system software, such as z/OS, Windows, Linux, UNIX, BSD, SunOS, Solaris, MacOS, or other compatible operating systems, including proprietary operating systems. Operating systems control and schedule computer processes for execution, perform memory management, provide file system, networking, and I/O services, and provide a user interface, such as a graphical user interface (GUI), among other things.

The computer system 2102 illustrated in FIG. 21 is coupled to a network 2118, such as a LAN, WAN, or the Internet via a communication link 2116 (wired, wireless, or a combination thereof). Network 2118 communicates with various computing devices and/or other electronic devices. Network 2118 is communicating with one or more computing systems 2120 and one or more data sources 2122. The dealer match engine module 2114 may access or may be accessed by computing systems 2120 and/or data sources 2122 through a web-enabled user access point. Connections may be a direct physical connection, a virtual connection, and other connection type. The web-enabled user access point may comprise a browser module that uses text, graphics, audio, video, and other media to present data and to allow interaction with data via the network 2118.

Access to the dealer match engine module 2114 of the computer system 2102 by computing systems 2120 and/or by data sources 2122 may be through a web-enabled user access point such as the computing systems' 2120 or data source's 2122 personal computer, cellular phone, smartphone, laptop, tablet computer, e-reader device, audio player, or another device capable of connecting to the network 2118. Such a device may have a browser module that is implemented as a module that uses text, graphics, audio, video, and other media to present data and to allow interaction with data via the network 2118.

The output module may be implemented as a combination of an all-points addressable display such as a cathode ray tube (CRT), a liquid crystal display (LCD), a plasma display, or other types and/or combinations of displays. The output module may be implemented to communicate with input devices 2112 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some embodiments, the system 2102 may comprise a physical or logical connection established between a remote microprocessor and a mainframe host computer for the express purpose of uploading, downloading, or viewing interactive data and databases online in real time. The remote microprocessor may be operated by an entity operating the computer system 2102, including the client server systems or the main server system, an/or may be operated by one or more of the data sources 2122 and/or one or more of the computing systems 2120. In some embodiments, terminal emulation software may be used on the microprocessor for participating in the micro-mainframe link.

In some embodiments, computing systems 2120 who are internal to an entity operating the computer system 2102 may access the dealer match engine module 2114 internally as an application or process run by the CPU 2106.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

The computing system 2102 may include one or more internal and/or external data sources (for example, data sources 2122). In some embodiments, one or more of the data repositories and the data sources described above may be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 2102 may also access one or more databases 2122. The databases 2122 may be stored in a database or data repository. The computer system 2102 may access the one or more databases 2122 through a network 2118 or may directly access the database or data repository through I/O devices and interfaces 2112. The data repository storing the one or more databases 2122 may reside within the computer system 2102.

Figure 22:
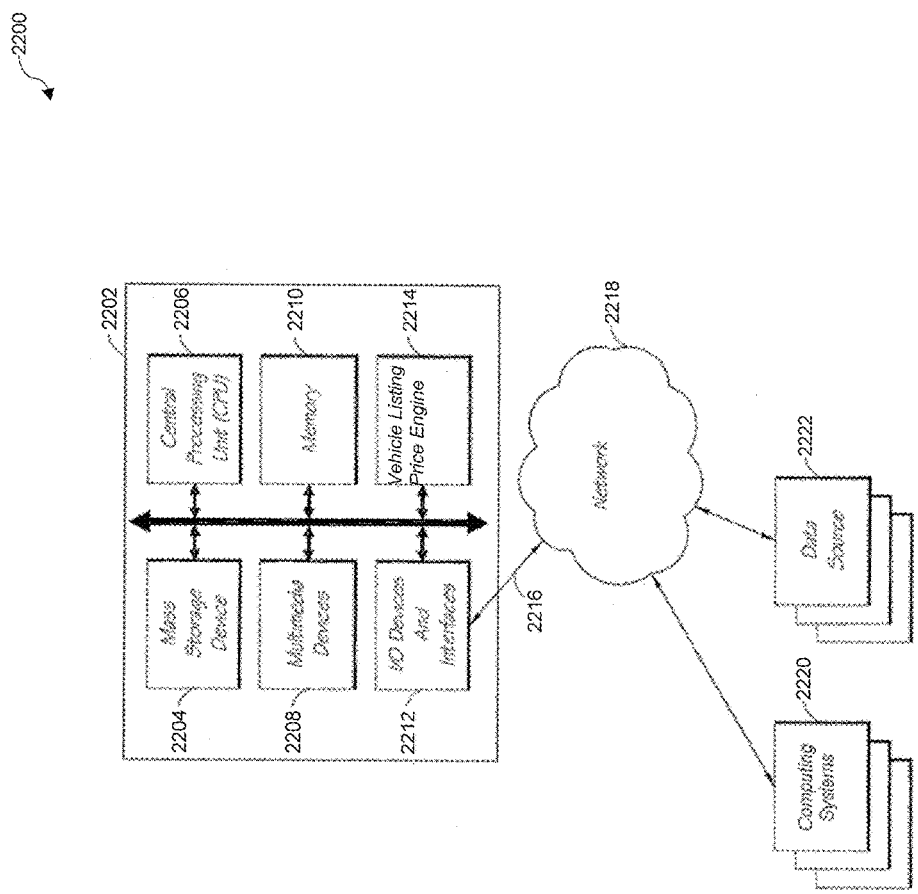
FIG. 22 is a block diagram illustrating an example embodiment of a computer system configured to run software for implementing one or more embodiments of the dynamic vehicle listing price determination systems, methods, and devices disclosed herein.

FIG. 22 is a block diagram depicting another embodiment of a computer hardware system configured to run software for implementing one or more embodiments of the used vehicle marketing and selling systems, methods, and devices disclosed herein.

In some embodiments, the systems, processes, and methods described herein are implemented using a computing system, such as the one illustrated in FIG. 22. The example computer system 2202 is in communication with one or more computing systems 2220 and/or one or more data sources 2222 via one or more networks 2218. While FIG. 22 illustrates an embodiment of a computing system 2202, it is recognized that the functionality provided for in the components and modules of computer system 2202 may be combined into fewer components and modules, or further separated into additional components and modules.

The computer system 2202 can comprise a vehicle listing price engine module 2214 that carries out the functions, methods, acts, and/or processes described herein. The vehicle listing price engine module 2214 is executed on the computer system 2202 by a central processing unit 2206 discussed further below.

In general, the word "module," as used herein, refers to logic embodied in hardware or firmware or to a collection of software instructions, having entry and exit points. Modules are written in a program language, such as JAVA, C or C++, PYPHON or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems and may be stored on or within any suitable computer readable medium or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 2202 includes one or more processing units (CPU) 2206, which may comprise a microprocessor. The computer system 2202 further includes a physical memory 2210, such as random access memory (RAM) for temporary storage of information, a read only memory (ROM) for permanent storage of information, and a mass storage device 2204, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 2202 are connected to the computer using a standards-based bus system. The bus system can be implemented using various protocols, such as Peripheral Component Interconnect (PCI), Micro Channel, SCSI, Industrial Standard Architecture (ISA) and Extended ISA (EISA) architectures.

The computer system 2202 includes one or more input/output (I/O) devices and interfaces 2212, such as a keyboard, mouse, touch pad, and printer. The I/O devices and interfaces 2212 can include one or more display devices, such as a monitor, that allows the visual presentation of data to a user. More particularly, a display device provides for the presentation of GUIs as application software data, and multi-media presentations, for example. The I/O devices and interfaces 2212 can also provide a communications interface to various external devices. The computer system 2202 may comprise one or more multi-media devices 2208, such as speakers, video cards, graphics accelerators, and microphones, for example.

The computer system 2202 may run on a variety of computing devices, such as a server, a Windows server, a Structure Query Language server, a Unix Server, a personal computer, a laptop computer, and so forth. In other embodiments, the computer system 2202 may run on a cluster computer system, a mainframe computer system and/or other computing system suitable for controlling and/or communicating with large databases, performing high volume transaction processing, and generating reports from large databases. The computing system 2202 is generally controlled and coordinated by an operating system software, such as z/OS, Windows, Linux, UNIX, BSD, SunOS, Solaris, MacOS, or other compatible operating systems, including proprietary operating systems. Operating systems control and schedule computer processes for execution, perform memory management, provide file system, networking, and I/O services, and provide a user interface, such as a graphical user interface (GUI), among other things.

The computer system 2202 illustrated in FIG. 22 is coupled to a network 2218, such as a LAN, WAN, or the Internet via a communication link 2216 (wired, wireless, or a combination thereof). Network 2218 communicates with various computing devices and/or other electronic devices. Network 2218 is communicating with one or more computing systems 2220 and one or more data sources 2222. The vehicle listing price engine module 2214 may access or may be accessed by computing systems 2220 and/or data sources 2222 through a web-enabled user access point. Connections may be a direct physical connection, a virtual connection, and other connection type. The web-enabled user access point may comprise a browser module that uses text, graphics, audio, video, and other media to present data and to allow interaction with data via the network 2218.

Access to the vehicle listing price engine module 2214 of the computer system 2202 by computing systems 2220 and/or by data sources 2222 may be through a web-enabled user access point such as the computing systems' 2220 or data source's 2222 personal computer, cellular phone, smartphone, laptop, tablet computer, e-reader device, audio player, or another device capable of connecting to the network 2218. Such a device may have a browser module that is implemented as a module that uses text, graphics, audio, video, and other media to present data and to allow interaction with data via the network 2218.

The output module may be implemented as a combination of an all-points addressable display such as a cathode ray tube (CRT), a liquid crystal display (LCD), a plasma display, or other types and/or combinations of displays. The output module may be implemented to communicate with input devices 2212 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some embodiments, the system 2202 may comprise a physical or logical connection established between a remote microprocessor and a mainframe host computer for the express purpose of uploading, downloading, or viewing interactive data and databases online in real time. The remote microprocessor may be operated by an entity operating the computer system 2202, including the client server systems or the main server system, an/or may be operated by one or more of the data sources 2222 and/or one or more of the computing systems 2220. In some embodiments, terminal emulation software may be used on the microprocessor for participating in the micro-mainframe link.

In some embodiments, computing systems 2220 who are internal to an entity operating the computer system 2202 may access the vehicle listing price engine module 2214 internally as an application or process run by the CPU 2206.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

The computing system 2202 may include one or more internal and/or external data sources (for example, data sources 2222). In some embodiments, one or more of the data repositories and the data sources described above may be implemented using a relational database, such as DB2, Sybase, Oracle, CodeBase, and Microsoft® SQL Server as well as other types of databases such as a flat-file database, an entity relationship database, and object-oriented database, and/or a record-based database.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Further, while the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present.

What is claimed is:

1. An algorithmic-based system for facilitating a sale of a used vehicle to a prospective purchaser during a pre-gray period or gray period, the system comprising:
   one or more computer readable storage devices configured to store a plurality of databases comprising:
      one or more price databases configured to store historical and/or current market pricing data corresponding to a plurality of completed used vehicle transactions and/or current used vehicle listings;
      one or more vehicle profile databases configured to store a plurality of vehicle profiles corresponding to a plurality of vehicles that will become available on an availability date, wherein the availability date is temporally remote from a present date;
      one or more purchaser profile databases configured to store a plurality of purchaser profile data, the purchaser profile data comprising one or more of financial data, desired vehicle identification information, and contact information corresponding to a plurality of prospective purchasers;
   one or more computer readable storage devices configured to store a plurality of computer executable instructions; and
   one or more hardware computer processors in communication with the one or more computer readable storage devices and configured to execute the plurality of computer executable instructions in order to cause the system to:
      determine a minimum listing price for a target used vehicle based on a consignor sale price, wherein the consignor sale price is obtained from one or more consignor used vehicle databases;
      determine dynamically a market price for the target used vehicle, wherein determining the market price comprises analyzing the historical and/or current market pricing data for one or more of the plurality of completed used vehicle transactions and/or current used vehicle listings for vehicles having analogous characteristics to the target used vehicle;
      calculate dynamically, by a vehicle listing price engine, a unique listing price for a prospective purchaser, the vehicle listing price engine configured to dynamically determine a plurality of unique listing prices, each unique listing price of the plurality of listing prices corresponding to each of the plurality of prospective purchasers for each of the plurality of vehicles, wherein the calculation comprises:
         analyzing purchaser profile data to determine lower and upper threshold pricing levels for the prospective purchaser;
         comparing the present date with the availability date;
         based on the comparison of the present date with the availability date, setting the unique listing price above the minimum listing price and below the market price; and
         wherein the difference between the unique listing price and the minimum listing price is lower when the present date is relatively temporally remote from the availability date, and the difference between the unique listing price and the minimum listing price is raised incrementally as the current date approaches the availability date; and
      transmit electronically a dynamically generated computer notification, the dynamically generated computer notification displayed through a dynamic user interface to the prospective purchaser, wherein the dynamically generated computer notification is configured to activate a remote subscriber computer and to enable connection via a URL over a computer network connection to a data source comprising data about the unique listing price, the dynamic user interface configured to display updated market and pricing information; and
      receive, over the computer network connection, an electronic confirmation from the prospective purchaser, wherein the electronic confirmation activates access to data for purchasing the target used vehicle, wherein the data is accessible only by the prospective purchaser.

2. The algorithmic-based system of claim 1, wherein the used vehicle is a passenger automobile.

3. The algorithmic-based-system of claim 1, wherein the transmitting electronically a dynamically generated computer notification is performed by the system during a pre-gray period.

4. The algorithmic-based system of claim 1, wherein the dynamic user interface is further configured to display a graphical representation of used vehicle pricing data as a function of time.

5. The algorithmic-based system of claim 1, wherein the dynamic user interface is further configured to automatically update its display based on newly acquired data and/or user interaction with the system.

6. The algorithmic-based system of claim 1, wherein the vehicle listing price engine is further configured to conduct a normalization process to transform incongruent data structures from the one or more price databases, one or more vehicle profile databases, and one or more purchaser profile databases into a single, unified data structure.

7. The algorithmic-based system of claim 1, further comprising:
one or more dealer databases configured to store a plurality of dealer profiles, the plurality of dealer profiles comprising desired transaction criteria for each of a plurality of dealers; and
a dynamic dealer match engine.

8. The algorithmic-based system of claim 7, wherein the dealer match engine is configured to select one more or more dealers to act as a counterparty in the purchase of the target vehicle.

9. The algorithmic-based system of claim 8, wherein the one or more dealers are selected based on the proximity of the one or more dealers to the prospective purchaser.

10. The algorithmic-based system of claim 7, wherein the dealer match engine is configured to generate dealer match scores to localize, from one or more dealer databases, one or more dealers to act as a counterparty in the purchase of the target vehicle.

11. The algorithmic-based system of claim 10, wherein the one or more hardware computer processors in communication with the one or more computer readable storage devices are further configured to execute the plurality of computer executable instructions in order to cause the algorithmic-based system to:
generate a dealer match score for each of the plurality of dealers, wherein the dealer match score comprises a measure of dealer compatibility with the purchase of the target vehicle, wherein the dealer match score is calculated by processing a plurality of transaction elements and performing a comparative analysis between the plurality of transaction elements and the desired transaction criteria for each of the plurality of dealers;
filter the plurality of dealers based on the generated dealer match score for each of the plurality of dealers to identify a first set of dealers having a generated dealer match score above a predetermined threshold level;
transmit electronically a dynamically generated computer notification to the first set of dealers, the dynamically generated computer notification configured to activate a remote subscriber computer and to enable connection via a URL over a computer network connection to a data source comprising data about the purchase of the target vehicle; and
receive, over the computer network connection, an electronic confirmation from a first dealer in the first set of dealers, wherein the electronic confirmation activates access to data for completing the purchase of the target vehicle, wherein the data is accessible only by the first dealer to activate the electronic confirmation through the computer network connection.

12. The algorithmic-based system of claim 11, wherein the comparative analysis comprises one or more of:
accessing the transaction criteria from the one or more dealer databases;
analyzing, based on a target vehicle transaction price, whether the purchase of the target vehicle will produce a dealer qualifying margin, wherein the dealer qualifying margin comprises a minimum sales margin amount that a dealer will require to act as the counterparty in the purchase of the target vehicle;
accessing, from one or more historical financing databases, historical purchase financing data to determine the probability that the purchase of the target vehicle will require financing by the one or more dealers;
dynamically determining the acceptable level of financing required by the one or more dealers;
processing a subsidiary used vehicle trade-in transaction, the processing comprising dynamically determining whether the subsidiary used vehicle trade-in transaction will alter the unique listing price of the target vehicle;
assessing, from the plurality of transaction elements, the probability that an extended service plan will be included in the purchase of the target vehicle;
determining if the probability that an extended service plan will be included in the purchase of the target vehicle meets a minimum service plan probability threshold required by the one or more dealers; and
evaluating whether the target vehicle constitutes an acceptable type prerequisite for the one or more dealers.

13. The algorithmic-based system of claim 11, wherein the transmitting electronically a dynamically generated computer notification to the first set of dealers is performed by the system during the pre-gray period or gray period.

14. The algorithmic-based system of claim 11, wherein the target vehicle is delivered to the first dealer for pickup by the prospective purchaser.

15. The algorithmic-based system of claim 1, wherein the used vehicle is one of the following: car, boat, truck, aircraft, motorcycle, bicycle, bus, camper, personal water craft, limousine, locomotive, moped, scooter, rickshaw, sleigh, tank, tractor, and van.

16. The algorithmic-based system of claim 1, wherein the dynamic user interface is further configured to prompt the prospective purchaser to select a dealer to act a as a counterparty in the purchase of the target vehicle.

17. The algorithmic-based system of claim 1, wherein the data source further comprises one or more selectable purchase selections in connection with the purchase of the target vehicle.

18. The algorithmic-based system of claim 1, wherein the one or more hardware computer processors in communication with the one or more computer readable storage devices are further configured to execute the plurality of computer executable instructions in order to cause the system to:
transmit electronically a dynamically generated computer confirmation, the dynamically generated computer confirmation displayed through the dynamic user interface to the prospective purchaser.

19. The algorithmic-based system of claim 1, wherein the target vehicle is selected by the perspective purchaser via a used vehicle search, wherein the used vehicle search is based on one or more search parameters.

20. The algorithmic-based system of claim 19, wherein the search parameters comprise one or more of: vehicle make, vehicle model, exterior color, interior color, price, body type, mileage, location, age, date of availability, vehicle history, VIN, vehicle type, trim level, transmission type, engine type, fuel type, condition, and user rating.

* * * * *